United States Patent [19]

Yamano et al.

[11] Patent Number: 5,304,924
[45] Date of Patent: Apr. 19, 1994

[54] EDGE DETECTOR

[75] Inventors: Akihiko Yamano, Yokohama; Hiroyasu Nose, Zama; Toshimitsu Kawase, Atsugi; Toshihiko Miyazaki, Isehara; Takahiro Oguchi, Atsugi, all of Japan

[73] Assignee: Canon Kabushiki Kaisha, Tokyo, Japan

[21] Appl. No.: 979,472

[22] Filed: Nov. 20, 1992

Related U.S. Application Data

[63] Continuation of Ser. No. 752,203, Aug. 21, 1991, abandoned, which is a continuation of Ser. No. 500,477, Mar. 28, 1990, abandoned.

[30] Foreign Application Priority Data

| | | | |
|---|---|---|---|
| Mar. 29, 1989 | [JP] | Japan | 1-74979 |
| Apr. 26, 1989 | [JP] | Japan | 1-104519 |
| Apr. 26, 1989 | [JP] | Japan | 1-104520 |

[51] Int. Cl.$^5$ .......................................... G01R 11/00
[52] U.S. Cl. ................................ 324/158 R; 324/73.1; 324/158 D; 250/306; 250/307
[58] Field of Search ............. 324/158 R, 158 D, 73.1, 324/72.5; 356/72, 357, 358; 250/306, 307, 310–311, 423 F, 442.1; 439/482

[56] References Cited

U.S. PATENT DOCUMENTS

| | | | |
|---|---|---|---|
| 3,726,595 | 4/1973 | Matsumoto | 356/111 |
| 4,357,085 | 11/1982 | Niwa et al. | 354/25 |
| 4,851,671 | 7/1989 | Pohl | 250/423 F |
| 4,870,352 | 9/1989 | Koechner | 324/158 D |
| 4,921,346 | 5/1990 | Tokumoto et al. | 250/306 |
| 4,939,363 | 7/1990 | Bando et al. | 250/306 |
| 4,941,753 | 7/1990 | Wickramasinghe | 250/306 |
| 4,992,659 | 2/1991 | Abraham et al. | 250/306 |
| 4,999,495 | 3/1991 | Miyata et al. | 250/423 F |
| 5,038,034 | 8/1991 | Fujita | 250/307 |

FOREIGN PATENT DOCUMENTS

| | | |
|---|---|---|
| 0219127 | 4/1987 | European Pat. Off. . |
| 0262253 | 4/1988 | European Pat. Off. . |
| 0290648 | 11/1988 | European Pat. Off. . |
| 0304893 | 3/1989 | European Pat. Off. . |
| 54-155832 | 8/1979 | Japan . |

OTHER PUBLICATIONS

Martin et al., "Atomic Force Microscope–Force Mapping and Profiling on a Sub 100–Å Scale", Journal of Applied Physics, vol. 61, No. 10, May 1987, pp. 4723 through 4729.
Grutter et al., "Application of Atomic Force Microscopy to Magnetic Materials", Journal of Vacuum Science & Technology, vol. 6, No. 2, Mar./Apr. 1988, pp. 279 through 282.
Bryant et al., "Scanning Tunneling and Atomic Force Microscopy Combined", Applied Physics Letters, vol. 52, No. 26, Jun. 1988, pp. 2233 through 2235.
"Non–Contact Aspheric Surface Measuring Devices", Optics, 16, (1987), pp. 145 and 146, (no month).
Binning et al., "Surface Studies by Scanning Tunneling Microscopy", Physical Review Letters, vol. 49, No. 1, Jul. 1982, pp. 57 through 61.
"Laser Rotary Encoder", O Plus E, 1986, pp. 82 through 87, (no month).
Binnig et al., "Atomic Force Microscopy", Physical Review Letters, vol. 56, No. 9, Mar. 1986, pp. 930 through 933.
Martin et al., "Magnetic Imaging by 'Force Microscopy' with 1000 Å Resolution", Appl. Phys. Lett., vol. 50, No. 20, May 1987, pp. 1455–1457.

*Primary Examiner*—Vinh Nguyen
*Attorney, Agent, or Firm*—Fitzpatrick, Cella, Harper & Scinto

[57] ABSTRACT

An edge detector is disclosed, which detector is improved by providing a probe moving relatively with a tested pattern, a device for detecting a working force or a tunnel current generated between the probe and the tested pattern, and a device for detecting an edge of the tested pattern according to the detected working force or tunnel current. An edge of the tested pattern is detected at high resolution by detecting the tunnel current flowing between a conductive tested pattern and a probe kept closely opposite thereto, or by detecting an atomic force or a magnetic force working between an insulated or a magnetic tested pattern and a lever.

51 Claims, 28 Drawing Sheets

FIG. 3A
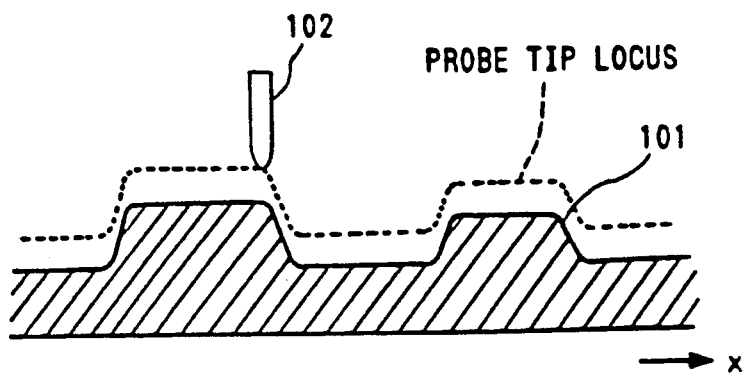
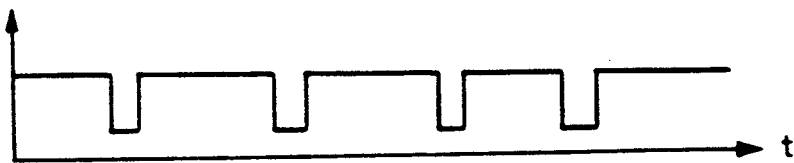
FIG.3B
SYNC DETECTION
SIGNAL 2a
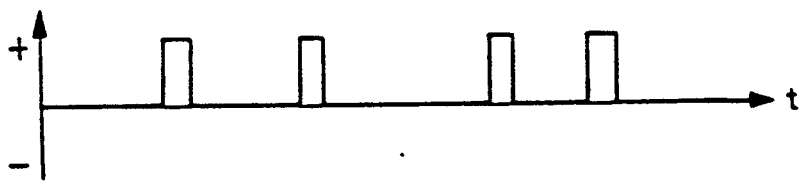
FIG.3C
EDGE DETECTION
SIGNAL 2b
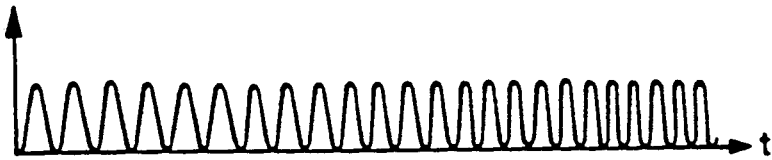
FIG.3D
LIGHT INTENSITY
CHANGE SIGNAL 2c
FIG.3E
LATERAL DIRECTION
MOVEMENT AMOUNT
SIGNAL 2d PROBE LONGITUDINAL
DIRECTION POSITION
CONTROL SIGNAL 12a EDGE DETECTION
SIGNAL 12b LIGHT INTENSITY
CHANGE SIGNAL 12c LATERAL DIRECTION
MOVEMENT AMOUNT
SIGNAL 12d TESTED PATTERN
LINE WIDTH
MEASUREMENT
VALUE 12e

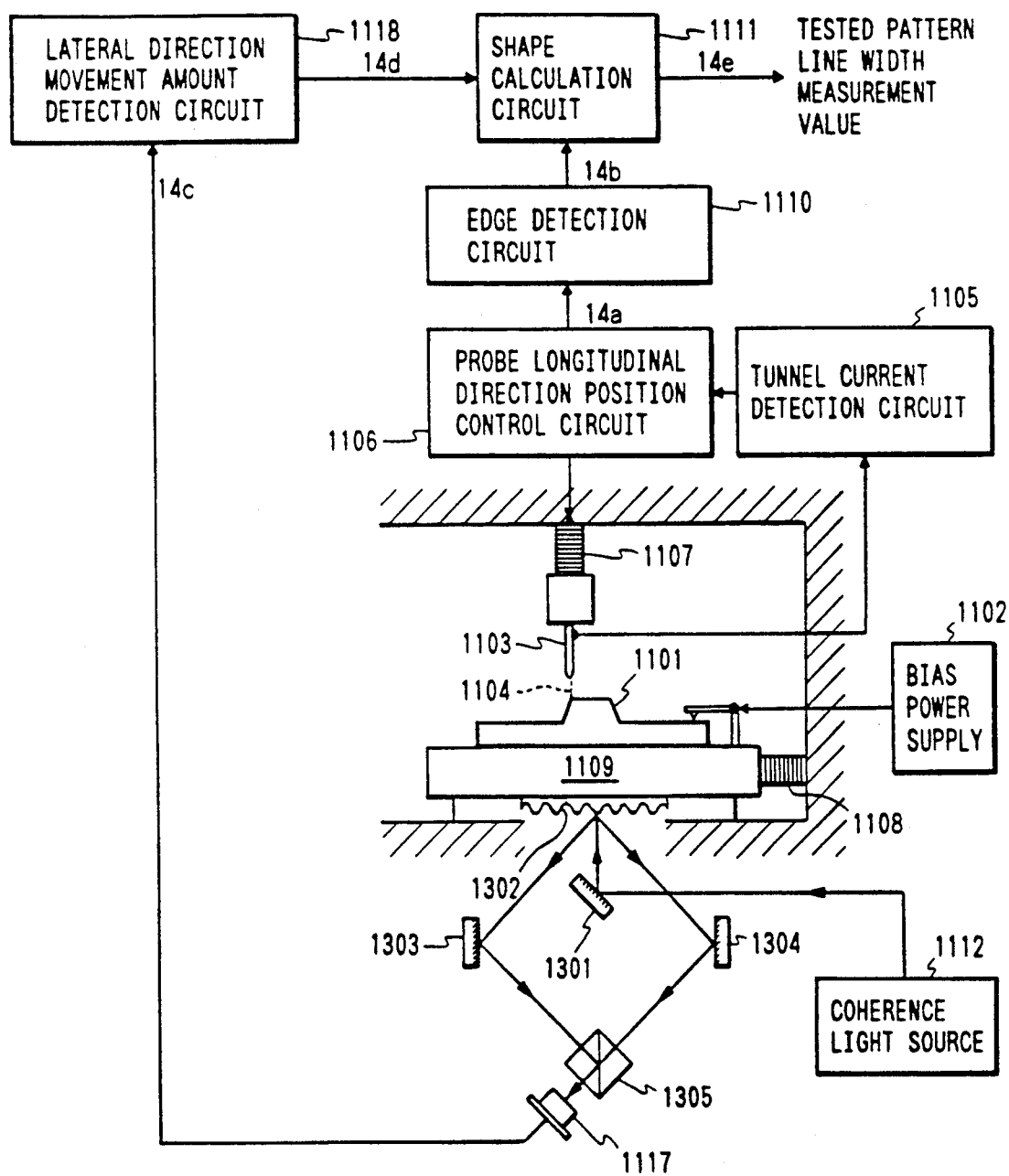

PROBE LONGITUDINAL DIRECTION POSITION CONTROL SIGNAL 14a

EDGE DETECTION SIGNAL 14b

LIGHT INTENSITY CHANGE SIGNAL 14c

LATERAL DIRECTION MOVEMENT AMOUNT SIGNAL 14d

TESTED PATTERN LINE WIDTH MEASUREMENT VALUE 14e

PROBE LONGITUDINAL
DIRECTION POSITION
CONTROL SIGNAL 16a

EDGE DETECTION
SIGNAL 16b

POSITION DETECTION
LIGHT RECEIVING
ELEMENT DIFFERENCE
SIGNAL 16c

LATERAL DIRECTION
MOVEMENT AMOUNT
SIGNAL 16d

TESTED PATTERN
LINE WIDTH
MEASUREMENT
VALUE 16e

PROBE TIP LOCUS

PROBE LONGITUDINAL
DIRECTION POSITION
CONTROL SIGNAL 18a

EDGE DETECTION
SIGNAL 18b

ELECTRIC CAPACITY
SIGNAL 18c

LATERAL DIRECTION
MOVEMENT AMOUNT
SIGNAL 18d

TESTED PATTERN
LINE WIDTH
MEASUREMENT
VALUE 18e

PROBE TIP LOCUS

PROBE LONGITUDINAL DIRECTION POSITION CONTROL SIGNAL 110a

EDGE DETECTION SIGNAL 110b

TUNNEL CURRENT SIGNAL 110c

LATERAL DIRECTION MOVEMENT AMOUNT SIGNAL 110d

TESTED PATTERN LINE WIDTH MEASUREMENT VALUE 110e

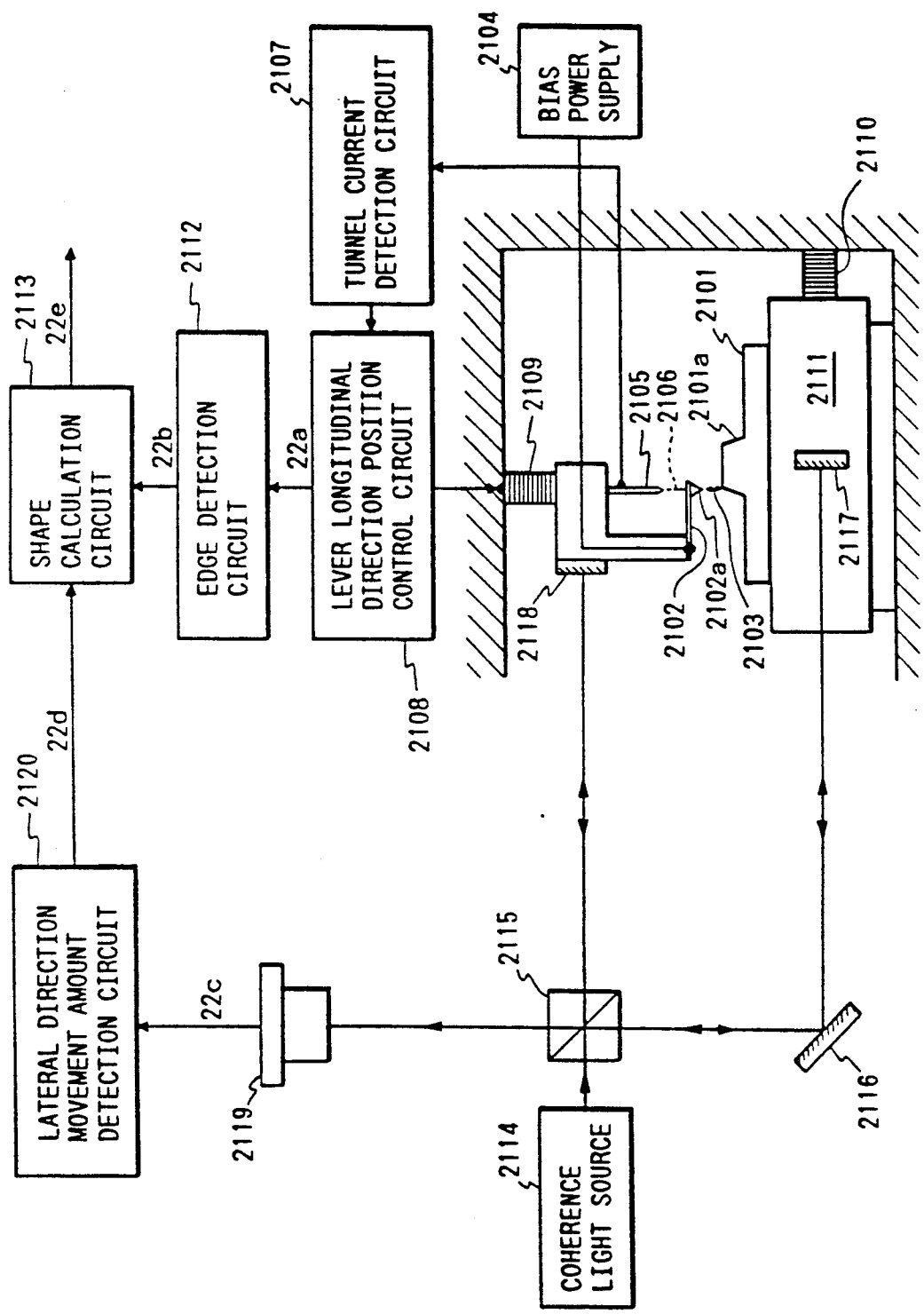

LEVER LONGITUDINAL
DIRECTION POSITION
CONTROL SIGNAL 22a

EDGE DETECTION
SIGNAL 22b

LIGHT INTENSITY
CHANGE SIGNAL 22c

LATERAL DIRECTION
MOVEMENT AMOUNT
SIGNAL 22d

TESTED PATTERN
LINE WIDTH
MEASUREMENT
VALUE 22e

FIG. 19A
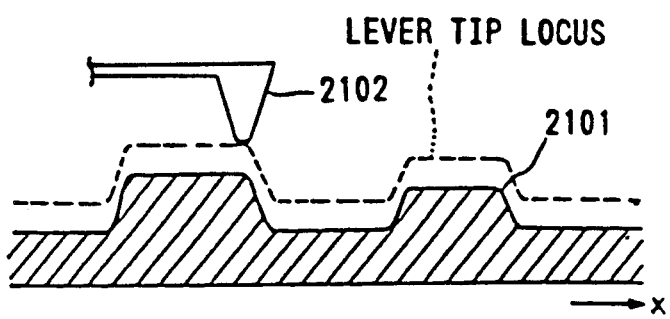
FIG. 19B
LEVER LONGITUDINAL
DIRECTION POSITION
CONTROL SIGNAL 24a
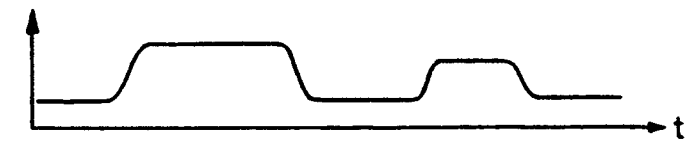
FIG. 19C
EDGE DETECTION
SIGNAL 24b
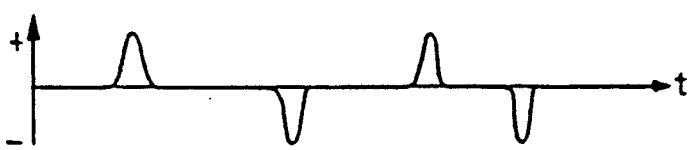
FIG. 19D
LIGHT INTENSITY
CHANGE SIGNAL 24c
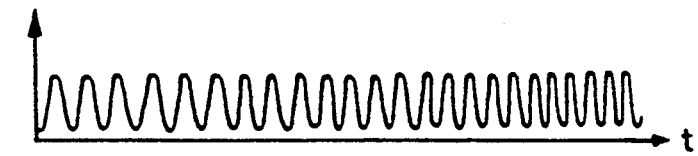
FIG. 19E
LATERAL DIRECTION
MOVEMENT AMOUNT
SIGNAL 24d
TESTED PATTERN
LINE WIDTH
MEASUREMENT
VALUE 24e
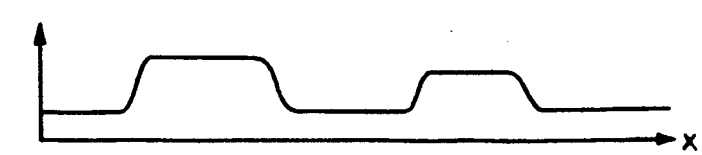
FIG. 19F FIG. 21A
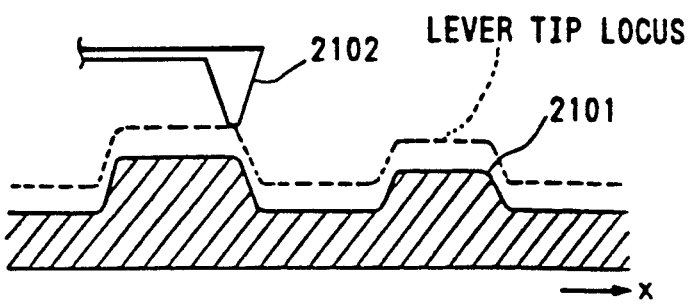
FIG. 21B
LEVER LONGITUDINAL
DIRECTION POSITION
CONTROL SIGNAL 26a
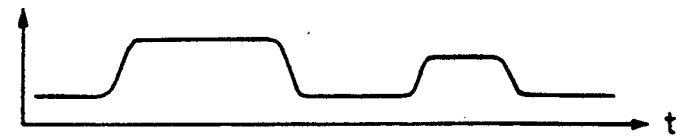
FIG. 21C
EDGE DETECTION
SIGNAL 26b
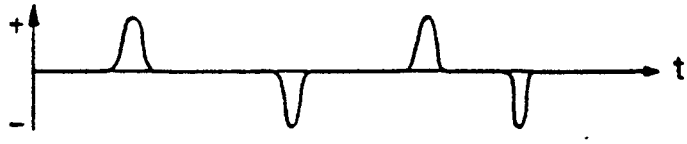
FIG. 21D
POSITION DETECTION
LIGHT RECEIVING
ELEMENT DIFFERENCE
SIGNAL 26c
FIG. 21E
LATERAL DIRECTION
MOVEMENT AMOUNT
SIGNAL 26d
TESTED PATTERN
LINE WIDTH
MEASUREMENT
VALUE 26e
FIG. 21F FIG. 23A
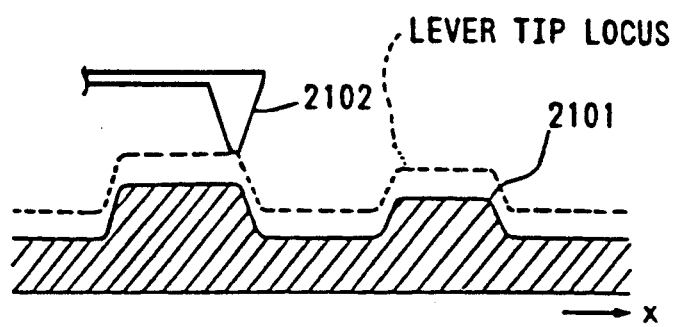
FIG.23B
LEVER LONGITUDINAL
DIRECTION POSITION
CONTROL SIGNAL 28a
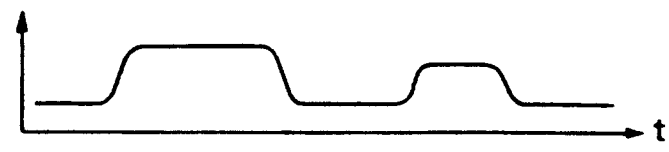
FIG.23C
EDGE DETECTION
SIGNAL 28b
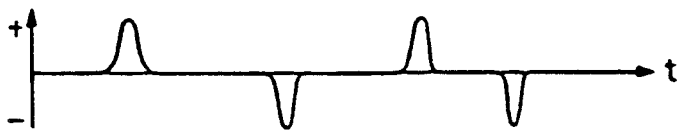
FIG.23D
ELECTRIC CAPACITY
SIGNAL 28c
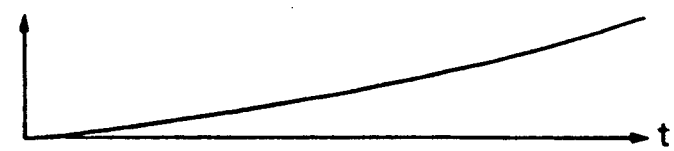
FIG.23E
LATERAL DIRECTION
MOVEMENT AMOUNT
SIGNAL 28d
TESTED PATTERN
LINE WIDTH
MEASUREMENT
VALUE 28e
FIG.23F FIG. 25A
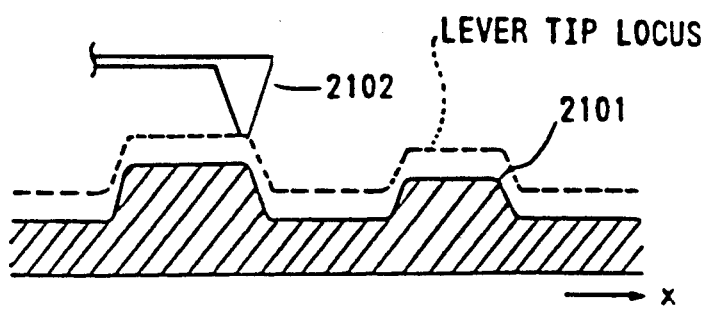
FIG. 25B
LEVER LONGITUDINAL
DIRECTION POSITION
CONTROL SIGNAL 210a
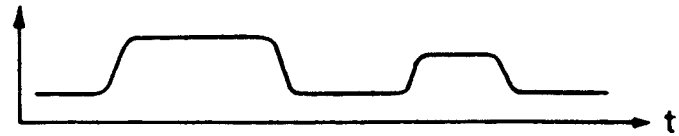
FIG. 25C
EDGE DETECTION
SIGNAL 210b
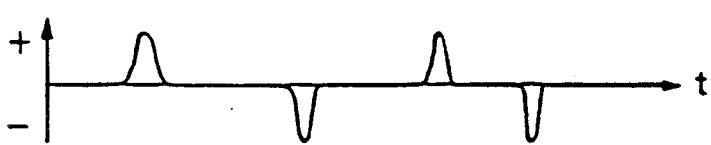
FIG. 25D
TUNNEL CURRENT
SIGNAL 210c
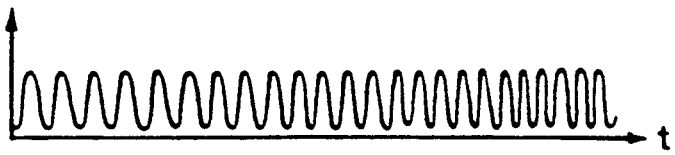
FIG. 25E
LATERAL DIRECTION
MOVEMENT AMOUNT
SIGNAL 210d
TESTED PATTERN
LINE WIDTH
MEASUREMENT
VALUE 210e
FIG. 25F FIG. 27A
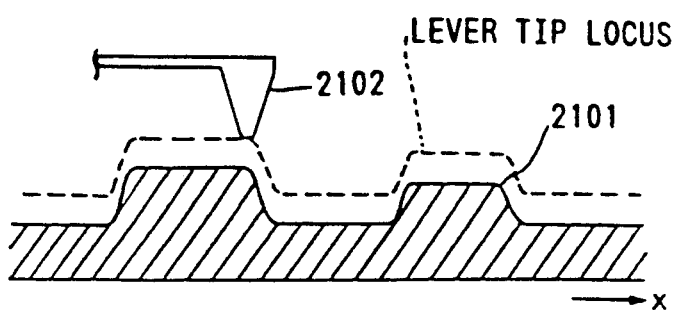
FIG. 27B
LEVER LONGITUDINAL
DIRECTION POSITION
CONTROL SIGNAL 212a
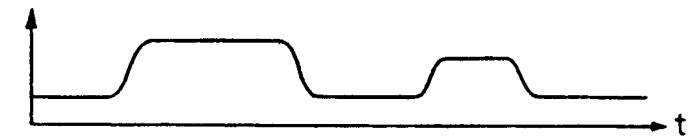
FIG. 27C
EDGE DETECTION
SIGNAL 212b
FIG. 27D
LIGHT INTENSITY
CHANGE SIGNAL 212c
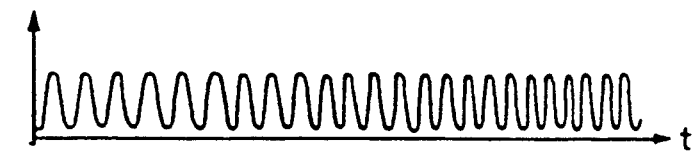
FIG. 27E
LATERAL DIRECTION
MOVEMENT AMOUNT
SIGNAL 212d
TESTED PATTERN
LINE WIDTH
MEASUREMENT
VALUE 212e
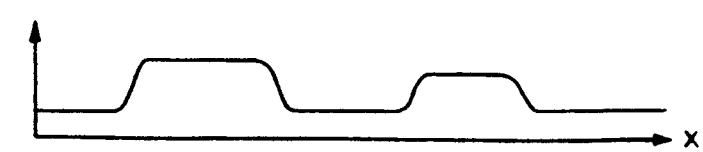
FIG. 27F LEVER LONGITUDINAL
DIRECTION POSITION
CONTROL SIGNAL 214a EDGE DETECTION
SIGNAL 214b LIGHT INTENSITY
CHANGE SIGNAL 214c LATERAL DIRECTION
MOVEMENT AMOUNT
SIGNAL 214d TESTED PATTERN
LINE WIDTH
MEASUREMENT
VALUE 214e

EDGE DETECTOR

This application is a continuation of application Ser. No. 07/752,203, filed Aug. 21, 1991, now abandoned, which is a continuation of prior application Ser. No. 07/500,477, filed Mar. 28, 1990, now abandoned.

BACKGROUND OF THE INVENTION

1. Field of the Invention

This invention relates to an edge detector, preferably for use on line width measuring apparatus for LSI patterns, encoder and others.

2. Related Background Art

Prior art detectors typically intended for this kind of measurement include a device for detecting an edge by applying a laser beam spot to a tested pattern and detecting scattered light from the pattern edge. Then, that of using an electron beam includes an electron beam device for detecting a tested pattern edge by applying a heat emission electron from a cathode or a field emission electron to a tested matter in concentration and detecting a secondary electron emitted from the tested matter.

However, in the case of prior art devices using laser beams, resolution cannot be minimized inasmuch as a beam spot size cannot be reduced any further than a limit, and satisfactory precision is not obtainable for detection of VLSI pattern edges of the semiconductor wafer further reduced down in structure, recently. Then, while attaining 10 nanometers of resolution anyhow, the device using electron beams is also not yet satisfactory for detection of VLSI pattern edges. Furthermore a vacuum system is required. Therefore, the device gets unavoidably large in size and working efficiency deteriorates, in addition.

SUMMARY OF THE INVENTION

In view of the problems inherent in the prior art, a primary object of the invention is to provide an edge detector small in size, simple in construction, and high in resolution and precision, at the same time.

Other and further objects of the invention will become apparent from illustrative embodiments of the invention which will be described in detail hereinafter.

BRIEF DESCRIPTION OF THE DRAWINGS

FIGS 3A through 3E are waveform diagrams showing signal examples of each part of the apparatus;

FIG. 8 is a block diagram of a line width measuring apparatus given in a fourth embodiment of the invention;

FIG. 16 is a block diagram of a line width measuring apparatus given in an eighth embodiment of the invention;

FIGS. 19A through 19F are waveform diagrams showing signal examples of each part of the apparatus;

FIGS. 21A through 21F are waveform diagrams showing signal examples of each part of the apparatus;

FIGS. 23A through 23F are waveform diagrams showing signal examples of each part of the apparatus;

FIGS. 25A through 25F are waveform diagrams showing signal examples of each part of the apparatus;

FIGS. 27A through 27F are waveform diagrams showing signal examples of each part of the apparatus;

DETAILED DESCRIPTION OF THE PREFERRED EMBODIMENTS

By applying a voltage between a conductive probe and a conductive substance kept as close as as 1 nanometer or so, and detecting a tunnel current flowing therebetween, STM is a device capable of obtaining a surface form of the conductive substance and various data on an electron distributed state at 0.1 nanometers in transverse resolution and 0.01 nanometers in longitudinal resolution [G. Binning et al., Phys. Rev. Lett. 49 (1982) 57].

Accordingly, from applying a principle of STM, an edge of a tested pattern can be detected at 0.1 nanometers in transverse resolution by applying a voltage between the tested pattern and a probe kept close thereto and detecting a tunnel current flowing therebetween.

Figure 1A:
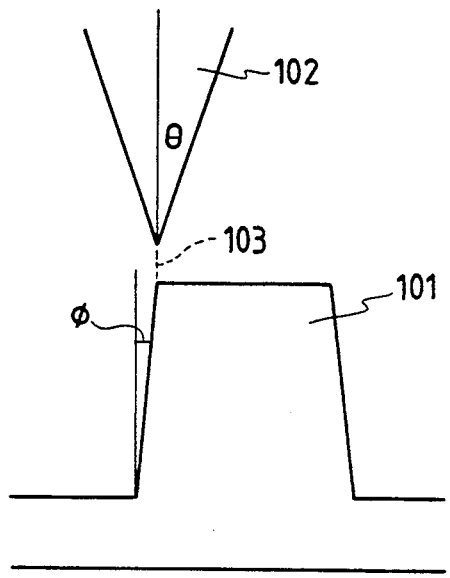
FIG. 1A and FIG. 1B are principle diagrams of a first embodiment of the invention.
Figure 1B:
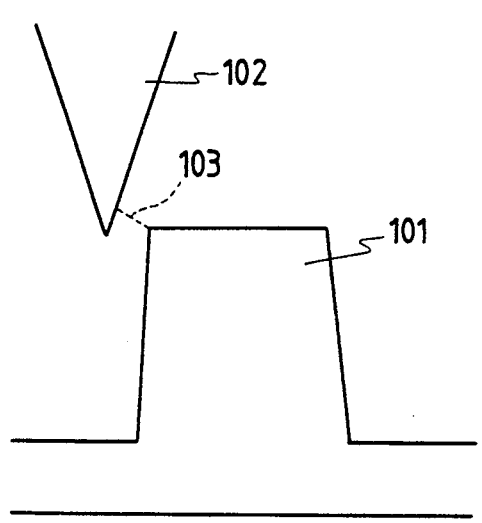

The edge detection in a first embodiment of the invention is realized on the following principle. A point whereat a tunnel current 103 flowing between a probe 102 and a tested matter 101 flows in STM shifts as shown in FIG. 1A and FIG. 1B according to a positional relation between the probe and the tested matter. Now, in case a tip of the probe is formed approximately at an angle θ axially and an angle φ of an edge portion of the tested matter formed axially is smaller than θ, the position whereat a flowing point of the tunnel current shifts is a spot where the probe approaches to the edge portion of a tested pattern.

Accordingly, when a high-frequency voltage is superposed on a control signal to a probe position control means, that is, the probe oscillates at high frequency longitudinally or laterally in the drawing, a component in equiphase with the high-frequency voltage of a detected tunnel current signal can be extracted by a signal processing circuit such as a high-pass filter, synchronous detection circuit or the like. In case a modulation signal of a predetermined frequency is applied to a longitudinal control signal for keeping the probe at a constant distance from a tested surface, that is, the probe oscillates at high frequency longitudinally in the drawing, the outgoing signal coordinates with a longitudinal variation of the tunnel current signal. When the tested pattern and the probe are subjected to a lateral relative movement, a component of the aforementioned predetermined frequency of the tunnel current signal changes in amplitude at a position where a flowing point of the tunnel current shifts from a tip of the probe as in FIG. 1A to a side of the probe as in FIG. 1B. The reason for this is that while a change of the tunnel current according to a change in distance between the probe and the tested matter due to the superposed high-frequency voltage is almost constant at the position other than a changed position, if, for example, the flowing point of the tunnel current changes from a state of the probe tip to a state of the probe side (for the probe forming the angle θ axially), a variation of distance between the probe and the tested matter becomes much almost sin θ times, and thus an amplitude of the signal of predetermined frequency changes accordingly.

Then, in case a modulation signal of predetermined frequency is applied to a lateral control signal of the probe, that is, the probe oscillates at high frequency transversely in the drawing, when the probe is positioned at a flat portion of the tested pattern where a distance between the probe and the tested pattern does not change, the tunnel current scarcely changes irrespective of a lateral oscillation. Therefore the aforementioned component of predetermined frequency is also constant (the amplitude being almost zero). However, when the probe is positioned at a non-flat portion not flat of the tested pattern, the tunnel current changes sharply according to a lateral modulation. Therefore, the component of predetermined frequency also changes (to be a predetermined amplitude).

Such positions where a modulated component of the tunnel current changes occur when the probe approaches to an edge portion of the tested pattern. Therefore, the edge can be detected by measuring the then signal change.

A line width measuring apparatus for detecting the edge will now be described as the first embodiment.

Figure 2:
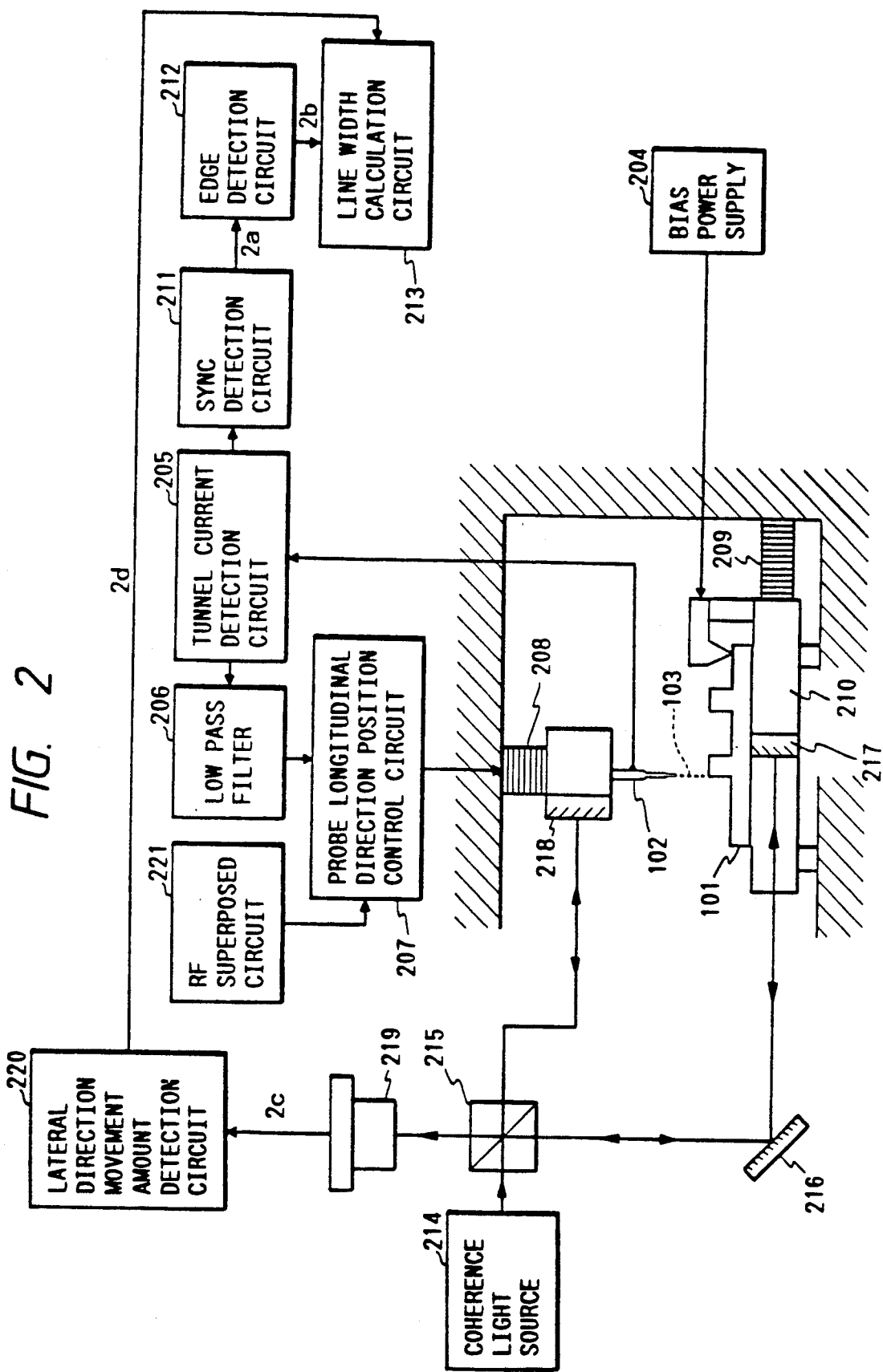
FIG. 2 is a block diagram of a line width measuring apparatus of the first embodiment of the invention.

The first embodiment of the invention is represented in FIG. 2, and signal examples in the embodiment are shown in FIGS. 3A through 3E. A bias voltage is applied to the tested pattern having a conductivity by a bias power supply 204, and the tunnel current 103 flowing between the tested pattern 101 and the probe 102 is kept close thereto at a distance of 1 nanometer or below by a tunnel current detection circuit 205. A low-frequency component of the detected tunnel current is extracted through a low-pass filter 206, and a longitudinal position of the probe 102 is controlled by a probe longitudinal direction position control circuit 207 and a probe longitudinal direction position control means (piezoelectric element, for example) 208 so as to keep the signal constant. Thus, a probe tip locus barring the oscillation component is as shown in FIG. 3A. A stage 210 is shifted laterally by stage driving means 209, and the tested pattern 101 is scanned by the probe 102. An edge of the tested pattern 101 is detected by an edge detection circuit 212 on a variation signal 2a obtained from passing the tunnel current signal obtained then through a synchronous detection circuit 211 (particularized hereinafter), and a plurality of edge detection signals 2b are sent to a line width calculation circuit 213. Next, a coherent light is divided into two by a beam splitter 215 from a coherence light source 214, one light is reflected on a mirror 217 fixed on the stage 210 by a mirror 216, and the reflected light is reincident on the beam splitter 215. The other light is reflected on a mirror 218 fixed near the probe 102 and is reincident on the beam splitter 215. The two reflected lights are combined again by the beam splitter 215 and incident on a photodiode 219 as an interference light. In this case, a luminance of the interference light incident on the photodiode 219 changes according to a lateral relative movement of the stage 210 or the tested pattern 101 and the probe 102. For example, if a wavelength of the coherent light is λ, the luminance changes for one period when the relative movement comes in λ/2. Accordingly, a relative lateral movement amount can be read at a precision of 1 nanometer by counting a light intensity change signal 2c from the photodiode 219. A lateral direction movement amount signal 2d is obtained from the counting through a lateral direction movement detection circuit 220, and a tested pattern line width measured value is calculated on the line width calculation circuit 213 according to the plural edge detection signal 2b and the lateral direction movement amount signal 2d.

In the edge detection of this embodiment, a predetermined high-frequency voltage is superposed on a control signal to the probe longitudinal position control means 208 by a high frequency superposed circuit 221. The aforementioned longitudinal high-frequency oscillation of the probe 102 is realized thereby. When a component in equiphase with the aforementioned high-frequency voltage is extracted out of the detected tunnel current signal by the synchronous detection circuit 211, the outgoing signal 2a coordinates with an amplitude of the afore-mentioned predetermined frequency component of the tunnel current signal. The predetermined frequency component of the tunnel current signal changes in amplitude at an edge portion of the tested matter as mentioned hereinbefore, and therefore, the detection signal may be used as an edge detection signal from detecting an output change of the signal 2a on the edge detection circuit 212.

In this embodiment, an arrangement for detection of an edge upper end portion of the tested pattern is such that an output change portion of the signal 2a coming at the odd time is output at the end and the output change portion coming at the even time is output at the beginning. An edge lower portion or edge central portion may be detected otherwise. Then, the low-pass filter 206 intended for position control of the probe is set so as to cut the aforementioned predetermined frequency (oscillation component).

Normally, the device applying such STM principle is placed for use entirely on an oscillation damping device.

However, a low-frequency oscillation, or oscillation of several Hz frequency concretely is difficult to be removed from the oscillation damping device currently in service. Accordingly, a noise of several Hz frequency is capable of arising on signals due to the oscillation. In this embodiment an edge detection free from influence of the low-frequency noise is realized by setting a frequency of the signal component extracted by the synchronous detection circuit 211, namely a predetermined frequency value of the high-frequency voltage superposed by the high frequency superposed circuit 221 higher than the noise, or concretely, not less than 100 Hz or 100 Hz to 100 KHz, for example.

The case wherein Michelson interferometric process using a single frequency laser as a coherence light source is applied is given in this embodiment. However, a photoheterodyne interferometry using a cycle orthogonal polarization laser such as a Zeeman laser, or the like, may be applied otherwise. Then, in this embodiment, a modulated high-frequency voltage was applied by means for controlling longitudinal relative position of the probe and the tested matter. However, means for controlling lateral relative position of the probe and the tested matter may be employed otherwise. Further, it is desirable that the two processes be used selectively or concurrently, both according to an angle and surface condition of an edge of the tested pattern, and a shape of the probe tip obtained. Then, a method for detecting a lateral movement amount of the probe in this embodiment is not necessarily limited to interferometry, and any length measuring method may be applied, subject to having a long-stroke and nanometer-order high resolution and high precision, like a grid interferometry indicated in Japanese Patent Examined Publication No. 50-23617 and O Plus E 1986.7.P82, a length measuring method applying TTL type active auto focusing process indicated in Japanese Patent Unexamined Publication No. 54-155832 and Optics 16 (1987) 145, an electric capacity change detecting method, an STM-applied encoder applied previously and others.

A second embodiment of the invention will be described, next. This embodiment refers to an encoder working on the aforementioned principle of edge detection.

Figure 5:
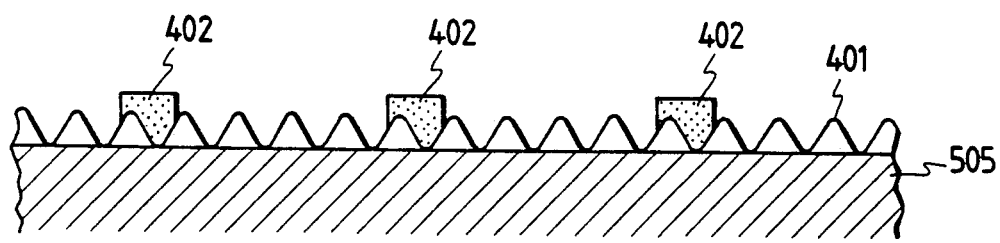
FIG. 5 is a detailed drawing of scale forms of the encoder.
Figure 4:
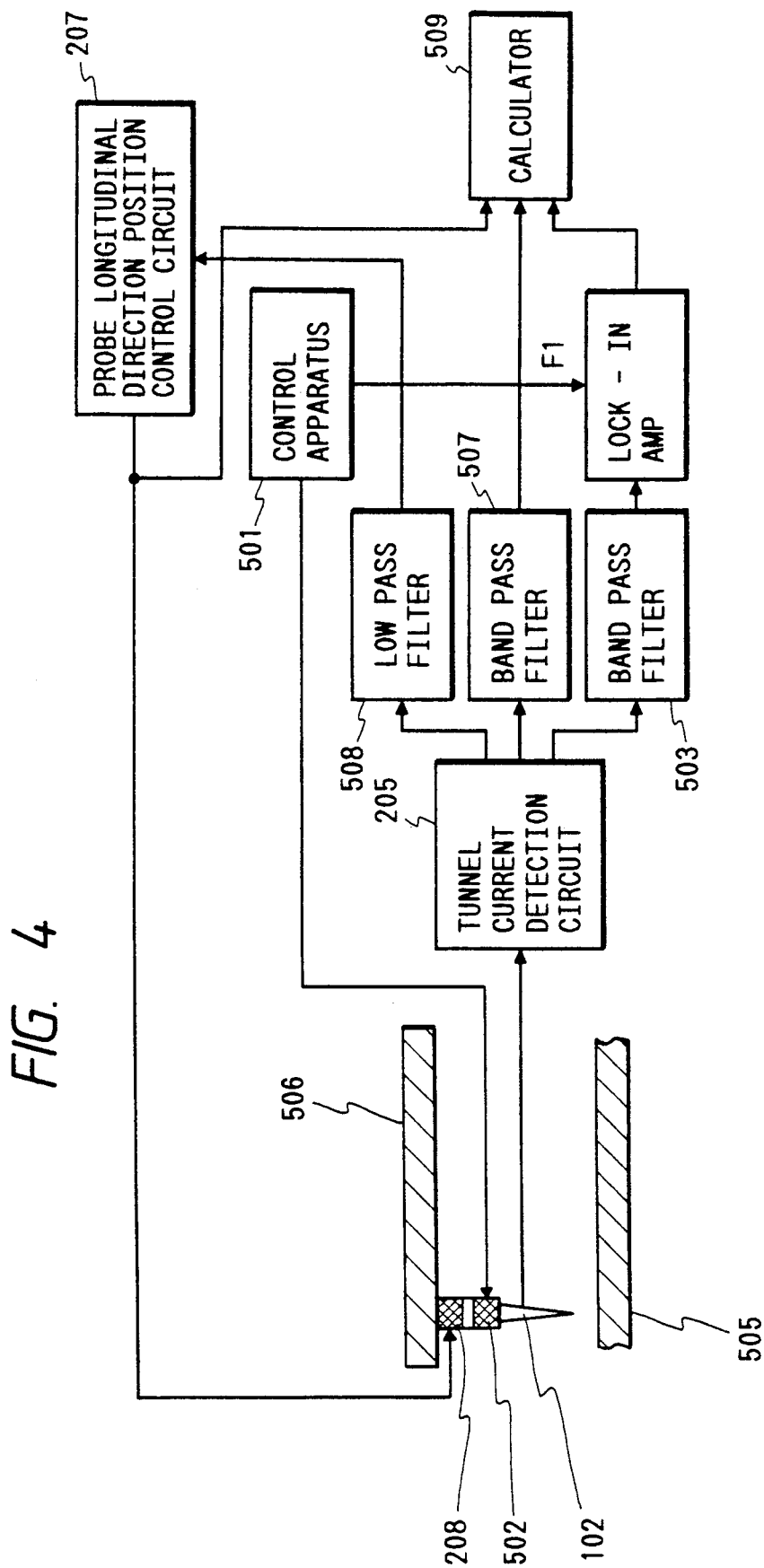
FIG. 4 is a block diagram of an encoder given in a second embodiment of the invention.

FIG. 4 is a schematic block diagram of an encoder relating to the second embodiment of this invention. Like reference characters denote like members as those already described hereinbefore in the different views of the drawings. A reference numeral 505 represents a scale side support member, 506 represents a probe side support member, one of which is provided on one of two matters relatively moving in the lateral direction in the drawing, and the other of which is provided on the other matter. A bias voltage is applied between the probe 102 and the support member 505. A scale form on the support member 505 viewed in the same direction as FIG. 4 is shown in detail in FIG. 5. A reference numeral 401 represents a reference array consisting of a known array with atom and molecule kept constant in period, 402 represents a scale with edge portions formed at predetermined intervals by sticking another substance on a part of the surface of the reference array 401. While both are indicated in the same proportions in the drawing, the scale 402 is appreciably larger than a tongued-and-grooved face of the reference array 401, actually. In FIG. 4 again, reference numeral 502 represents a lateral direction driving mechanism for driving the probe 102 in the direction where the relative moving distance is detected (laterally in the drawing), and 501 represents a control apparatus for the lateral direction driving mechanism.

A control signal with a frequency F1 for detecting a moving direction and a frequency F2 for detecting edges, which is higher than F1, superposed therefor is provided to the lateral direction driving mechanism 502 by the control apparatus 501. Accordingly, the probe 102 oscillates infinitesimally on the scale laterally in the drawing as superposing oscillations of the frequency F1 and oscillations of the frequency F2. A reference numeral 503 represents a band-pass filter with the passing frequency band ready for F1, 504 represents a lock-in amplifier for subjecting an output from the band-pass filter 503 to a phase detection by the frequency F1 component of a control signal generated by the control means 501, 507 represents a band-pass filter with the passing frequency band ready for F2, 508 represents a low-pass filter with the passing frequency band set satisfactorily lower than F1, 509 represents an arithmetic operator for calculating a relative moving distance from outputs of the lock-in amplifier 504, the band-pass filter 507 and the probe longitudinal direction position control circuit 207.

A method for measuring a moving distance on the arithmetic operator 509 will be described next. An outgoing signal of the band-pass filter 503 having a signal input from the tunnel current detection circuit 205 is subjected to a phase detection by the lock-in amplifier 504 according to the frequency F1. An output code of the signal coordinates with the relative moving direction as positive if the support member 506 moves rightward in the drawing to the support member 505, and as negative if moving leftward in the drawing. (However, an amplitude of the probe on the frequency F1 is not larger than the width of one tongued-and-grooved face of the reference array.) Accordingly, a relative moving direction of the support member 505 with a scale and the support member 506 with a probe electrode is detected from the code of an outgoing signal of the lock-in amplifier 504. Then, an edge portion detection signal of the scale 402 is obtainable on the principle described in the first embodiment by catching a change of the signal of the band-pass filter 507 with the passing frequency band ready for F2. That is, a fluctuation of the amplitude of a frequency F2 component of the tunnel current signal is detected by the arithmetic operator 509, and the fluctuation detection signal is made to work as an edge portion detection signal of the scale 402. (However, an amplitude of the probe oscillation on the frequency F2 is made satisfactorily larger than the tongued-and-grooved face of the reference array so as not to detect a side portion of the tongued-and-grooved face of the reference array.) The edge portion detection signal is counted according to the moving direction obtained from outgoing signals of the arithmetic operator 509 or the lock-in amplifier 504, thereby detecting the relative moving distance roughly.

Then, a magnitude of the control signal generated by the probe longitudinal direction position control circuit 207 toward the probe longitudinal direction position control means so as to make the signal constant according to a signal isolated by the low-pass filter LPF 508 with the band set satisfactorily lower than the frequency F1 will indicate a tongued-and-grooved state of the reference array to which the probe is opposite. A relative movement amount of the resolution within an interval between the scales 402 may be detected by counting an oscillation frequency of the signal in the moving direction. That is, the scale can be interpolated. In case the relative movement is large and an amount of the movement must be measured roughly in a short time, the edge detection signal will only be counted. However, since SN ratio of the edge detection signal is high, precision of the measurement is enhanced.

Other embodiments of the invention will be described. The following embodiments refer to a line width measuring apparatus applying the STM principle and also employing a principle of edge detection different from the above-described embodiments.

A precision of edge detection applying the STM principle and using a tunnel current is high in transverse resolution as mentioned above. Accordingly, a pattern line width measuring apparatus small in size, simple in construction and having a long-stroke nanometer-order high resolution and high precision will be realized from measuring the length between edges by means of a device applying an optical measuring method ensuring a long stroke and high resolution as driving amount detection means for detecting an amount to drive a probe and a tested matter relatively between edges, an electric capacity change detecting method, a length measuring method by tunneling and the like.

An interferometry represented by a Michelson interferometer will be taken up first as an optical one-dimensional length measuring method. A coherent light such as a laser beam or the like is divided into two optical paths, each light is beam being irradiated onto two objects producing a relative displacement, the two reflected light beams again being combined to interference, and the relative displacement of the two objects is detected according to a change in intensity of the interference light, thereby attaining a resolution at 1 nanometer in combination with a detection technique such as a photoheterodyne process, signal phase split and the like. A grid interference method disclosed in Japanese Patent Publication No. 50-23617 and "O Plus E, 1986, 7, P82" will be taken up secondly, wherein a diffraction grid scale of several-micrometer pitches is mounted on an object to measure displacement, a coherent light such as a laser beam or the like is irradiated on the scale vertically (the direction of displacement being parallel with the scale), a plurality of diffracted lights are combined to interference, and a displacement of the measuring object is detected from a change in intensity of the interference light, thereby attaining a resolution of nanometer order in combination with a detection technique such as a photoheterodyne process, signal phase split and the like. Thirdly, there is a length measuring method applying TTL type active auto focusing as disclosed in Japanese Patent Laid-Open No. 54-155832 and "Optics 16 (1987) 145", wherein beams of light are irradiated onto an object to be measured for displacement through an objective from outside the axis, a dislocation of beams of the reflected light due to a shift of the object is detected by a position detection light receiving element placed at a position conjugate with an irradiation point, thereby attaining a displacement detection resolution of the measuring object at 1 nanometer.

The electric capacity change detecting method comprises providing metallic plates on two objects producing a relative displacement each, thus obtaining an amount of the relative displacement from a change in electric capacity between the plates. Here, an electric capacity C between the plates is expressed as $C = \epsilon S/d$ ($\epsilon$: dielectric constant of a medium between plates, S: plate area, d distance between plates), and it is found that a change in the distance between plates, namely an amount of relative displacement is obtainable from a change in electric capacity. Then, an AC voltage is applied between the plates, an impedance between the plates is detected, thereby detecting the electric capacity. A nanometer-order relative displacement detection resolution will be attained according to such method for detecting a change in the electric capacity.

In case the aforementioned STM principle is applied to drive amount detecting means, a probe and a reference scale kept closely opposite to each other are provided on two objects producing a relative displacement, a voltage is applied therebetween, and a tunnel current is carried. A relative displacement amount is then detected by detecting a change in the tunnel current arising when a probe tip scans the reference scale according to the relative displacement of the two objects. A relative displacement detection resolution at 1 nanometer or below will be attained from using an atomic array of conductive crystal cleavage face as the reference scale.

Accordingly, a plurality of edge intervals of a tested pattern can be detected at a long-stroke and nanometer-order resolution by detecting a relative lateral movement amount between the tested pattern and the probe kept close thereto in a combined application of the optical one-dimensional length measuring method, electric capacity change detecting method or length measuring method by tunneling.

Figure 6:
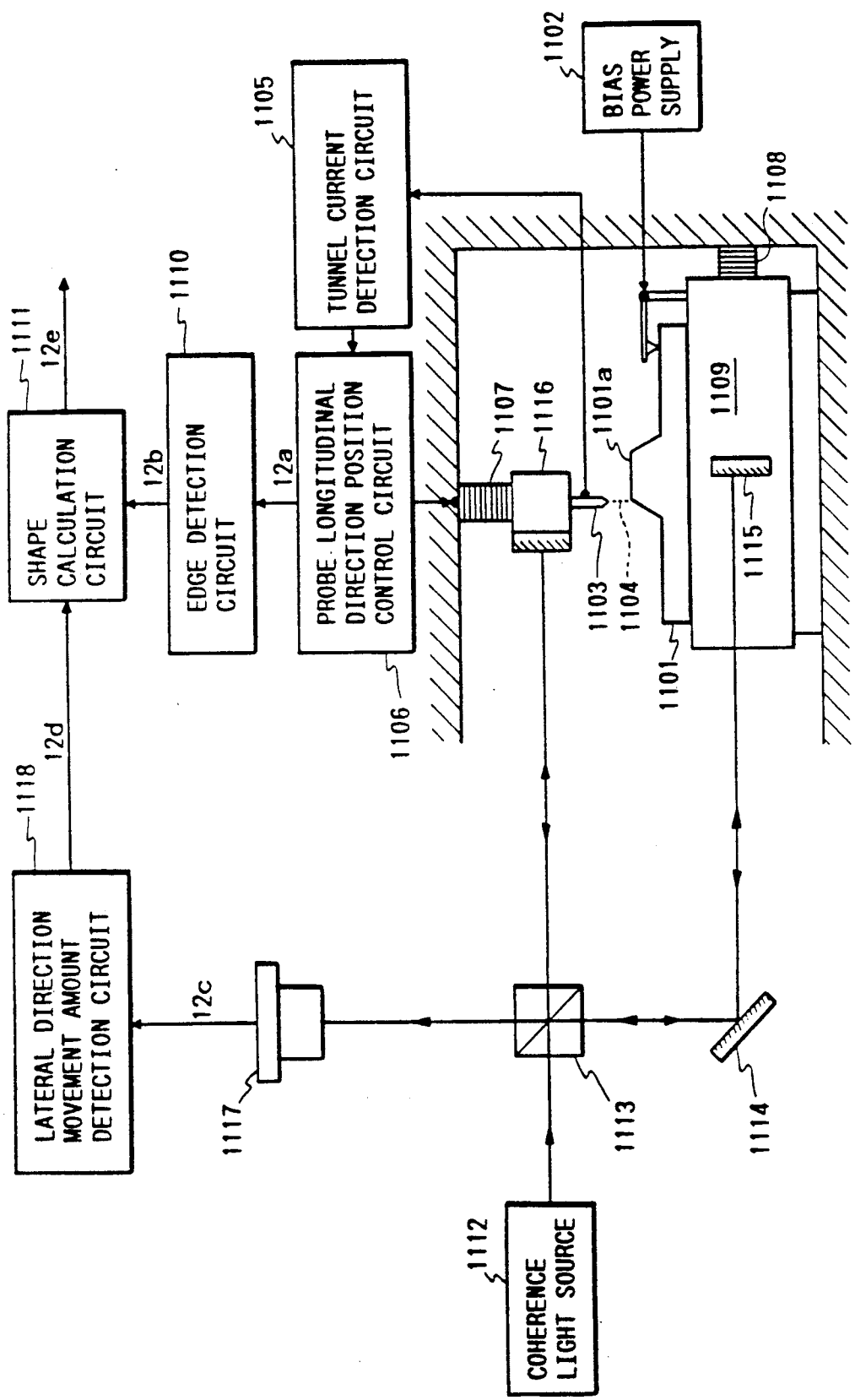
FIG. 6 is a block diagram of a line width measuring apparatus given in a third embodiment of the invention.

FIG. 6 is a block diagram of a line width measuring apparatus given in a third embodiment of the invention, and FIGS. 7A through 7F are waveform diagrams showing signal examples in each part of the apparatus.

As shown in FIG. 6. the line width measuring apparatus comprises a stage 1109 holding a tested matter 1101 on which a conductive tested pattern 1101a is formed, a conductive probe 1103 with the tip disposed close to the tested matter 1101, stage driving means 1108 for driving the probe 1103 and the stage 1109 in the direction of measurement, a bias power supply 1102 for impressing a voltage between the probe 1103 and the tested pattern 1101a to generate a tunnel current, a tunnel current detection circuit 1105 for detecting the tunnel current, a probe longitudinal direction position control circuit 1106 and probe longitudinal direction position control means 1107 for controlling a distance between the probe 1103 and the tested matter 1101 so as to keep the tunnel current detected by the tunnel current detection circuit 1105 constant, an edge detection circuit 1110 for detecting an edge of the tested pattern 1101a according to a control signal 12a generated from the probe longitudinal direction position control circuit 1106, a coherence light source 1112 for detecting a relative drive amount of the probe 1103 and the stage 1109 in the direction of measurement, a beam splitter 1113, mirrors 1114, 1115, 1116, a photodiode 1117 and a lateral direction movement detection circuit 1118, a shape calculation circuit 1111 for calculating an edge position of the tested pattern 1101a detected on detection signals 12d, 12b generated from the lateral direction movement detection circuit 1118 and the edge detection circuit 1110 and outputting a line width measurement value 12e of the tested pattern 1101a.

Figure 7A:
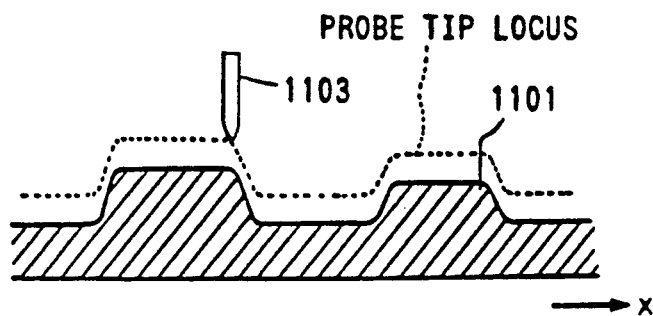
FIGS. 7A through 7F are waveform diagrams showing signal examples of each part of the apparatus.
Figure 7B:
Figure 7C:
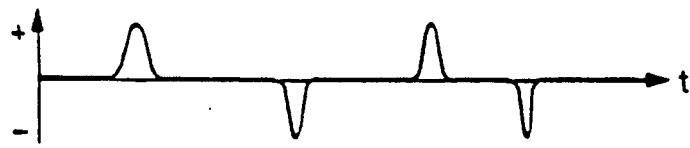
Figure 7D:
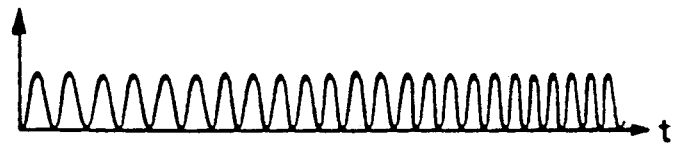
Figure 7E:
Figure 7F:
Figure 9A:
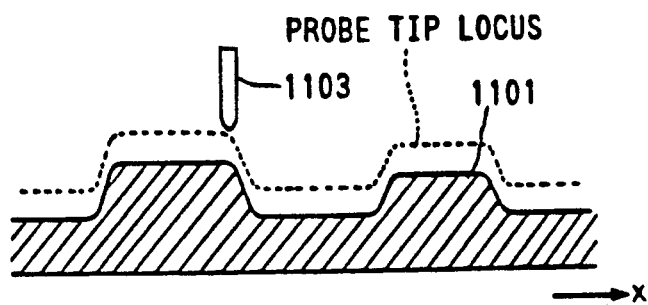
FIGS. 9A through 9F and waveform diagrams showing signal examples of each part of the apparatus.
Figure 9B:
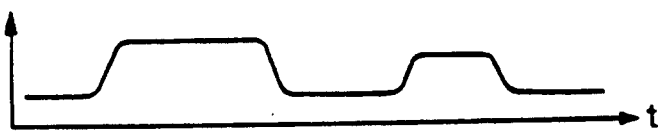
Figure 9C:
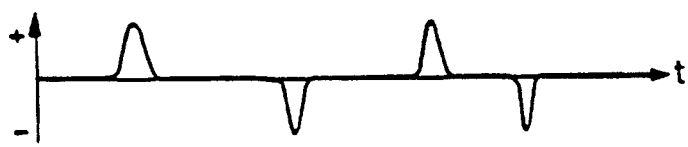
Figure 9D:
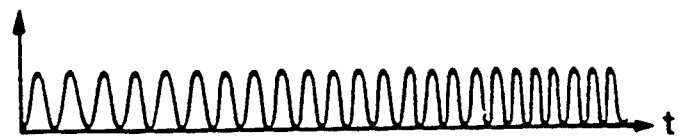
Figure 9E:
Figure 9F:

In the construction described above, a bias voltage is applied to the tested pattern 1101a by the bias power supply 1102, and a tunnel current 1104 flowing between the tested pattern 1101a and the probe 1103 kept closely opposite thereto at a distance not longer than 1 nanometer is detected by the tunnel current detection circuit 1105. Then, the probe 1103 is subjected to a longitudinal position control by the probe longitudinal direction position control circuit 1106 and the probe longitudinal direction position control means 1107 so as to keep the detected tunnel current constant. The stage 1109 is moved transversely by the stage driving means 1108 concurrently therewith, and a tip of the probe 1103 scans the tested pattern 1101a. A locus of the probe tip in this case is as shown in FIG. 7A. Then, an edge of the tested pattern 1101a is detected by the edge detection circuit 1110 from the probe longitudinal direction position control signal 12a thus obtained, and a plural edge detection signal 12b is output to the shape calculation circuit 1111.

The edge detection circuit 1110 includes a differentiation circuit, and when the signal 12a changes in output at the edge portion, an output (differentiation signal) according to the change speed is generated. The change speed corresponding signal is used as an edge detection signal. A position where the signal is maximized in value or the center position of a half-amplitude level is used as the edge position. The edge detection signal 12b becomes positive if, for example, the edge faces right upward in FIG. 7A, and negative if left upward according to how the edge to scan faces.

On the other hand, a coherent light of a single frequency from the coherence light source 1112 is divided into two by the beam splitter 1113 in parallel therewith, one light is incident on the mirror 1115 fixed on the stage 1109 through the mirror 1114, the reflected light is reincident on the beam splitter 1113, the other light is incident on the mirror 1116 fixed near the probe 1103, and the reflected light is reincident on the beam splitter 1113. Then, the two reflected lights are combined again by the beam splitter 1113 and incident on the photodiode 1117 as an interference light. In this case, there arises a change in brightness of the interference light incident on the photodiode 1117 according to a lateral relative movement of the stage 1109 or the tested pattern 1101a and the probe 1103. For example, if a wavelength of the coherent light is $\lambda$, the brightness changes for one period when relative movement amount is $\lambda/2$. Accordingly, the relative lateral movement amount can be read at a precision of 1 nanometer by counting a light intensity change signal 12c from the photodiode 1117. The counting is effected on the lateral direction movement detection circuit 1118 to obtain the lateral direction movement amount signal 12d, which is output to the shape calculation circuit 1111.

In the shape calculation circuit 1111, the tested pattern line width measurement value 12e is calculated and output according to the plural edge detection signal 12b and lateral direction movement amount signal 12d.

In the example, a pattern line width value is measured according to an increment of the lateral direction movement amount signal from generation of a positive edge detection signal until generation of a negative edge detection signal, and the result is output.

Then, the case where Michelson interferometry using a single frequency laser as the coherence light source 1112 is applied is indicated in this embodiment. However, a photoheterodyne interferometry using a double frequency orthogonal polarization laser such as a Zeeman laser or the like may be applied otherwise.

Embodiment 4

FIG. 8 is a block diagram of a line width measuring apparatus given in a fourth embodiment of the invention, and FIGS. 9A through 9F are waveform diagrams showing signal examples in each part of the apparatus.

As shown in FIG. 8, the apparatus is different from that of FIG. 6 only in a construction of means for detecting a relative drive amount of the probe 1103 and the stage 1109 in the direction of measurement, the relative drive amount detection means comprises a diffraction grid 1302 fixed on the stage 1109, a mirror 1301 for getting an output light of the coherence light source 1112 incident on the diffraction grid 1302, mirrors 1303, 1304 reflecting for combining lights diffracted by the diffraction grid 1302, and a beam splitter 1305 for combining the diffracted lights reflected on the mirrors 1303, 1304 to incidence on the photodiode 1117.

In the above-described construction, a coherent light from the coherence light source 1112 is incident on the diffraction grid 1302 through the mirror 1301, and when $\pm$ n-th degree diffracted lights thus obtained are reflected by the mirrors 1303, 1304, and incident on the beam splitter 1305, the two diffracted lights are combined together by the beam splitter 1305, and then incident on the photodiode 1117 as an interference light. In this case, there arises a change in brightness of the interference light incident on the photodiode 1117 by a lateral relative movement of the stage 1109 or the tested pattern 1101a and the probe 1103. For example, if the relative movement amount corresponds to one pitch of the diffraction grid 1302, then in case $\pm$ first degree diffracted lights are made to interfere, the brightness changes for two periods. Accordingly, a lateral direction movement amount signal 14d is obtained by counting a light intensity change signal 14c generated from the photodiode 1117 on the lateral direction movement detection circuit 1118, and is outputted to the shape calculation circuit 1113.

A tested pattern line width measurement value 14e is calculated and output by the shape calculation circuit 1113 as in the case of the third embodiment according to the lateral direction movement amount signal 14d and a plurality of edge detection signals 14b are obtained as in the case of the third embodiment.

Then, the case wherein the method is combined with the grid interferometry using a single frequency laser as the coherence light source 1112 is indicated in this embodiment. However, it may be combined with the grid interferometry according to the photoheterodyne process using a double cycle orthogonal polarization laser such as a Zeeman laser or the like.

Embodiment 5

Figure 10:
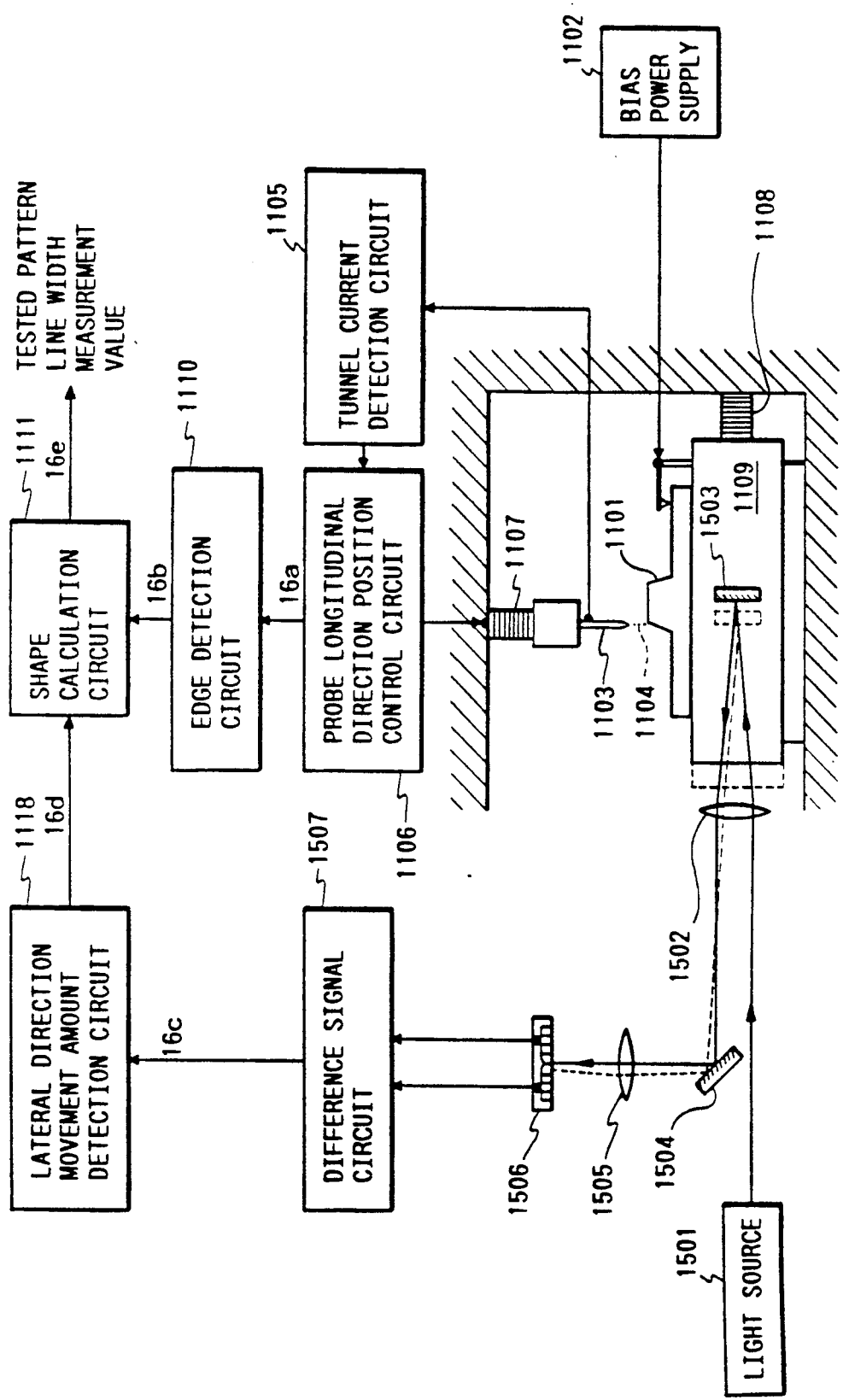
FIG. 10 is a block diagram of a line width measuring apparatus given in a fifth embodiment of the invention.
Figure 11A:
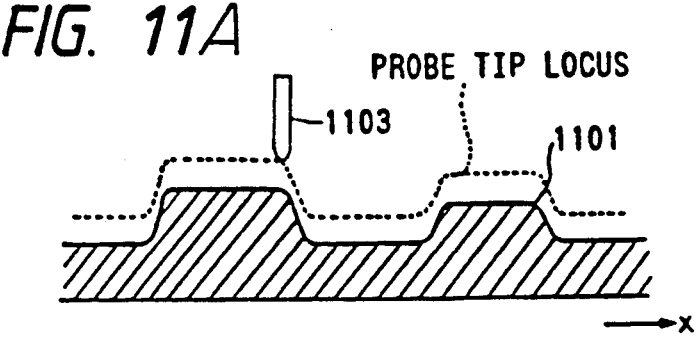
FIGS. 11A through 11F and waveform diagrams showing signal examples of each part of the apparatus.
Figure 11B:
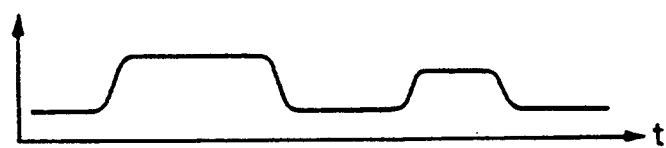
Figure 11C:
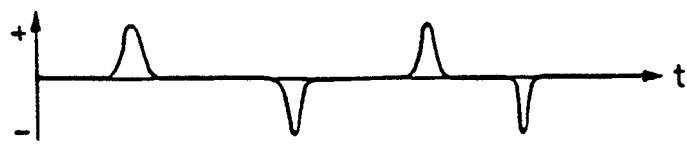
Figure 11D:
Figure 11E:
Figure 11F:

FIG. 10 is a block diagram of a line width measuring apparatus relating to a fifth embodiment of the invention, and FIGS. 11A through 11F are waveform diagrams showing signal examples in each part of the apparatus.

As shown in FIG. 10, the apparatus is also different from that of FIG. 6 only in a construction of means for detecting a relative drive amount, the relative drive amount detection means comprising a light source 1501, a mirror 1503 fixed on the stage 1109, an objective lens 1502 for obtaining an output light of the light source 1501 incident on the mirror 1503 and transmitting the reflected light, an imaging lens 1505 for imaging the transmitted light, a position detection light receiving element 1506 for detecting a position of the image, and a difference signal circuit 1507 for outputting a difference signal 16c between a light quantity signal integral value coming rightward of the center position of the position detection light receiving element 1506 and that of coming leftward thereof to the lateral direction movement detection circuit 1118.

In such a construction, a parallel luminous flux from the light source 1501 is incident on the objective lens 1502 outside the axis, and the transmitted light is reflected by the mirror 1503 fixed on the stage 1109. In this case, a position of the objective lens 1502 is controlled so that a position of the mirror 1503 will come near a focus of the objective lens 1502. A flux of the reflected light becomes parallel again through the objective lens 1502 and is incident on the center position of the position detection light receiving element 1506 by way of a mirror 1504 and the imaging lens 1505. In this case, the center position of the position detection light receiving element 1506 is controlled so as to come on a focus position of the imaging lens 1505. Here, the luminous flux incident on the position detection light receiving element 1506 becomes dislocated laterally of the direction of incidence according to a lateral relative movement of the stage 1109 or the tested pattern 1101 and the probe 1103. Accordingly, the difference signal 16c between a light quantity signal integral value coming rightward of a center position of the position detection light receiving element 1506 and that of coming leftward thereof is obtained by the difference signal circuit 1507, and since the lateral relative movement amount can be read at a precision of 1 nanometer by monitoring it, a lateral direction movement amount signal 16d is obtained through the lateral direction movement detection circuit 1118, which is output to the shape calculation circuit 1111. In the shape calculation circuit 1111, a tested pattern line width measurement value 16e is calculated and output as in the case of the third embodiment according to the lateral direction movement amount signal 16d and a plurality of edge detection signals 16b are obtained as in the case of the third embodiment.

Embodiment 6

Figure 12:
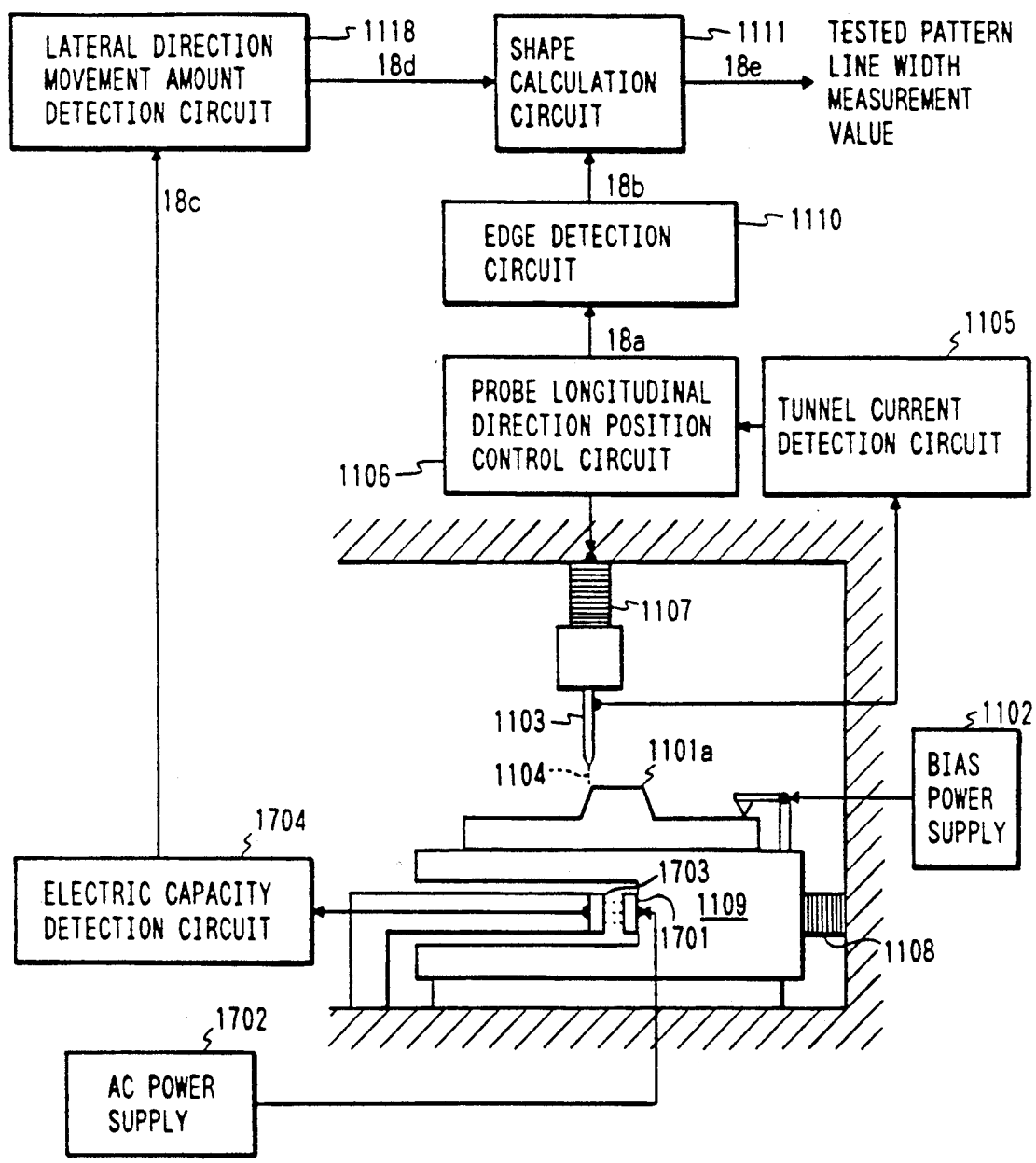
FIG. 12 is a block diagram of a line width measuring apparatus given in a sixth embodiment of the invention.
Figure 13A:
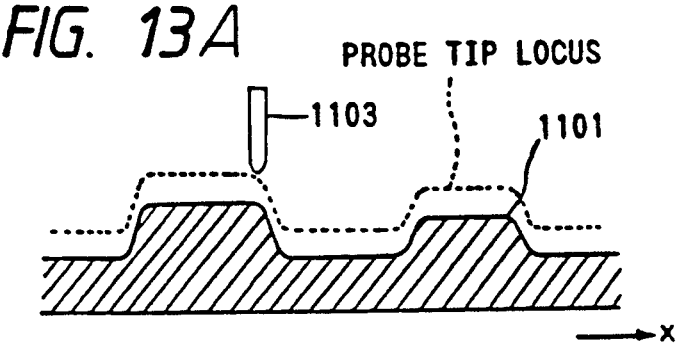
FIGS. 13A through 13F are waveform diagrams showing signal examples of each part of the apparatus.
Figure 13B:
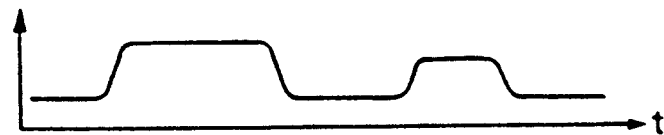
Figure 13C:
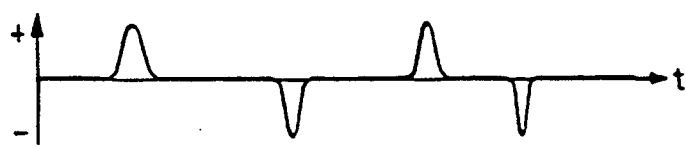
Figure 13D:
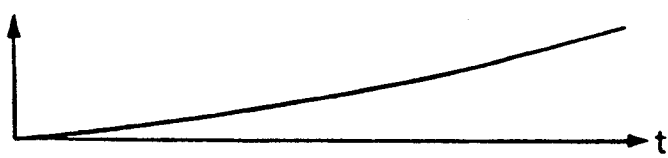
Figure 13E:
Figure 13F:
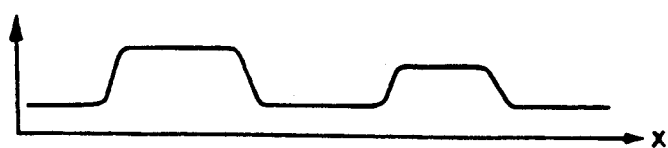

FIG. 12 is a block diagram of a line width measuring apparatus given in a sixth embodiment of the invention, and FIGS. 13A through 13F are waveform diagrams showing signal examples in each part of the apparatus.

As shown in FIG. 12, the apparatus is also different from that of FIG. 6 only in a construction of the relative drive amount detection means, the relative drive amount detection means comprising a plate 1701 fixed on the stage 1109, a plate 1703 having the position fixed against the probe 1103, an AC power supply 1702 for applying an AC voltage between the plates 1701, 1703, and an electric capacity detection circuit 1704 for detecting an electric capacity between the plates 1701, 1703 and generating an electric capacity signal 18c to the lateral direction movement detection circuit 1118.

In the above-described construction, an AC voltage is applied to the plate 1701 by the AC power supply 1702, and an electric capacity between the plates 1701 and 1703 is detected by the electric capacity detection circuit 1704. However, when the stage 1109 or the tested pattern 1101 and the probe 1103 make a relative movement transversely, the electric capacity between the plates 1701, 1703 changes. Accordingly, the lateral relative movement amount can be read at a precision of 1 nanometer by monitoring the electric capacity signal 18c. Therefore, a lateral direction movement amount signal 18d is obtained through the lateral direction movement detection circuit 1118, and is output to the shape calculation circuit 1111. In the shape calculation circuit 1111, a tested pattern line width measurement value 18e is calculated and output as in the case of the third embodiment according to the lateral direction movement amount signal 18d and a plurality of edge detection signals 18b are obtained as in the case of the third embodiment.

Embodiment 7

Figure 14:
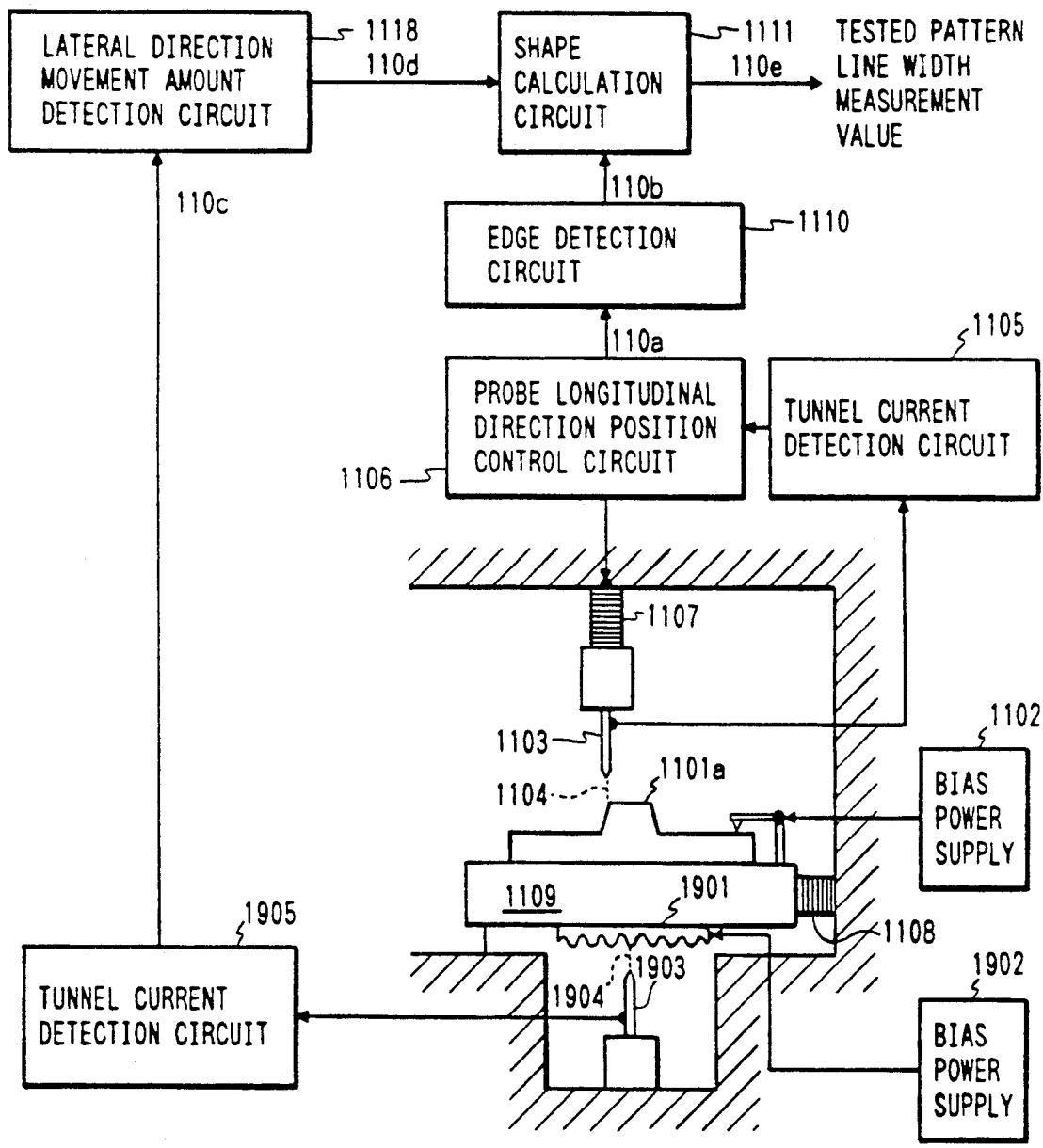
FIG. 14 is a block diagram of a line width measuring apparatus given in a seventh embodiment of the invention.
Figure 15A:
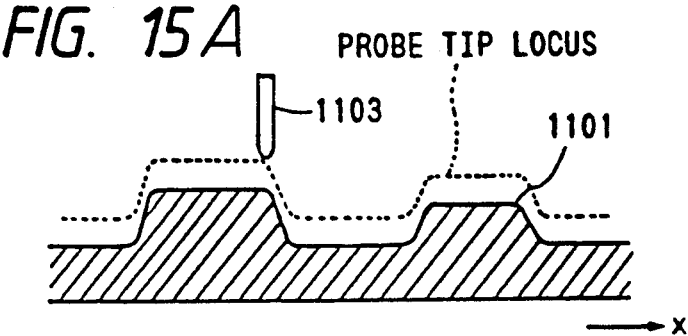
FIGS. 15A through 15F are waveform diagrams showing signal examples of each part of the apparatus.
Figure 15B:
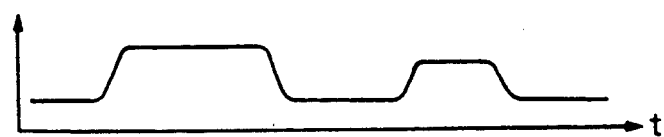
Figure 15C:
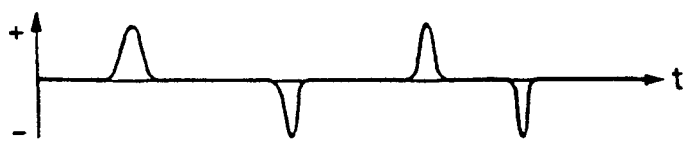
Figure 15D:
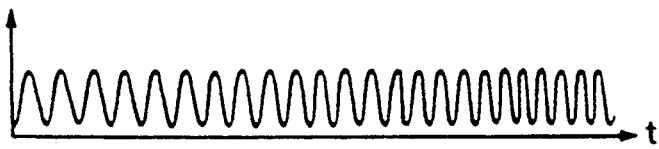
Figure 15E:
Figure 15F:
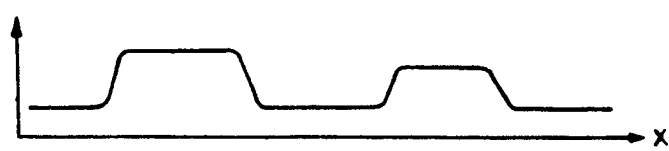
Figure 17A:
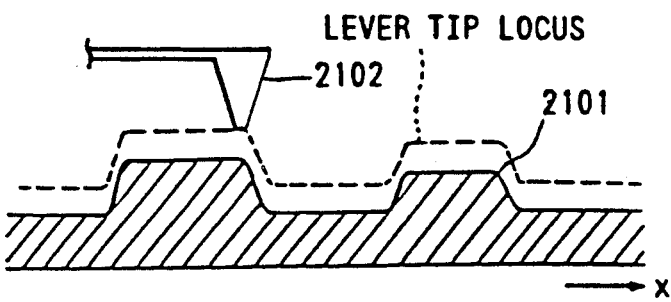
FIGS. 17A through 17F are waveform diagrams showing signal examples of each part of the apparatus.
Figure 17B:
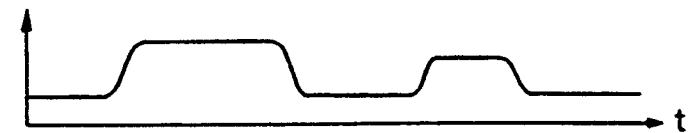
Figure 17C:
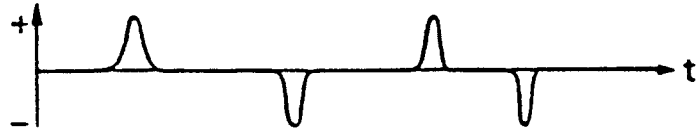
Figure 17D:
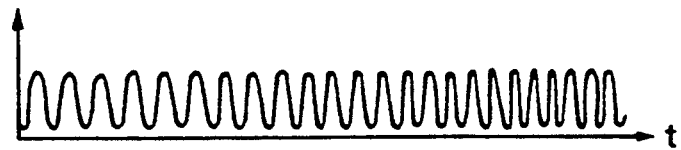
Figure 17E:
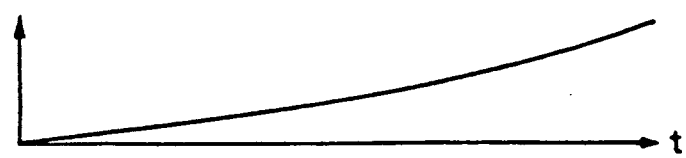
Figure 17F:
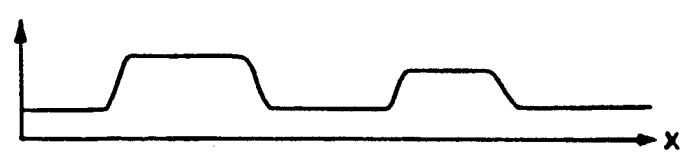

FIG. 14 is a block diagram of a line width measuring apparatus relating to a seventh embodiment of the invention, and FIGS. 15A through 15F are waveform diagrams showing signal examples in each part of the apparatus.

The apparatus is also different from that of FIG. 6 only in a construction of the relative drive amount detection means, the relative drive amount detection means comprising a conductive reference scale 1901 fixed on the stage 1109, a probe 1903 having the tip kept close to the reference scale 1901 at 1 nanometer or below and the position fixed against the probe 1103, a bias power supply 1902 for applying a bias voltage between the reference scale 1901 and the probe 1903, and a tunnel current detection circuit 1905 for detecting a tunnel current 1904 flowing between the reference scale 1901 and the probe 1903 and generating a tunnel current signal 110c to the lateral direction movement detection circuit 1118.

In the above-described construction, a bias voltage is applied to the reference scale 1901, and the tunnel current 1904 flowing between the probe 1903 and the reference scale 1901 is detected by the tunnel current detection circuit 1905. However, when the stage 109 or the tested pattern 1101a and the probe 1103 move relatively in the lateral direction, an interval between the reference scale 1901 and the probe 1903 changes at a pitch period of the reference scale 1901, and the tunnel current 1904 changes in intensity. For example, if an atomic array of cleavage plane surface of a conductive crystal such as graphite or the like is used as the reference scale 1901, and an interatomic distance is 0.2 nanometers, then the change in intensity corresponds to one period when the relative movement amount is 0.2 nanometers. Accordingly, the lateral relative movement amount can be read at a precision of 1 nanometer or below from the tunnel current signal 110c from the tunnel current detection circuit 1905, and hence, the lateral direction movement detection circuit 1118 obtains a lateral direction movement amount signal 110d by counting the tunnel current signal 110c, and outputs it to the shape calculation circuit 1111.

In the shape calculation circuit 1111, a tested pattern line width measurement value 110e is calculated and output as in the case of the third embodiment according to the lateral direction movement amount signal 110d and a plurality of edge detection signals 110b are obtained as in the case of the third embodiment.

Further embodiments of the invention will be described. The following embodiments refer to a line width measuring apparatus for edge detection applying other principles of STM.

An atomic force microscope (hereinafter referred to as AFM) capable of measuring insulating materials and a magnetic force microscope (hereinafter referred to as MFM) capable of measuring magnetic materials have been invented as those for which STM is developed, and these are intended for measuring an infinitesimal shape and size of insulating materials and magnetic materials.

AFM and MFM as those for which STM is developed are capable of obtaining information on shape of the insulating material surface and structure of the magnetic material surface at high resolution from detecting an atomic force and magnetic force working between the surface of insulating material and magnetic material samples and a lever (lever consisting of a magnetic material in the case of magnetic material samples) kept close to the surface as far as 1 nanometer or so [G. Binning et al., Phys. Rev. Lett. 56 (1986) 930, Y. Martin et al., Appl. Phys. Lett. 50 (1987) 1455].

Accordingly, an edge of the tested pattern may be detected at a transverse resolution of 0.1 nanometers by detecting an atomic force or magnetic force working between the tested pattern of insulating materials or magnetic materials and the lever kept closely thereto from applying AFM or MFM principle.

Then, a relative lateral movement of the tested pattern and the lever kept close thereto is detected by applying an optical one-dimensional length measuring method as described hereinbefore, an electric capacity change detecting method or a length measuring method by tunneling, thereby detecting a plural edge interval of the tested pattern in a long-stroke and nanometer-order Embodiment 8

FIG. 16 is a block diagram of a line width measuring apparatus relating to an eighth embodiment of the invention, and FIGS. 17A through 17F are waveform diagrams showing signal examples in each part of the apparatus.

As shown in FIG. 16, the line width measuring apparatus comprises a stage 2111 for holding a tested matter 2101 on which an insulating tested pattern 2101a is formed, a lever 2102 having its one end fixed, provided with a projection 2102a subjected to an atomic force 2103 as a working force from the tested matter 2101 on the other free end and disposing the projection 2102a close to the tested matter 2101, stage driving means for driving the lever 2102 and the stage 2111 in the direction of measurement, a bias power supply 2104 for detecting the atomic force 2103 as a displacement of the free end of the lever 2102, a probe 2105 and a tunnel current detection circuit 2107, a lever longitudinal direction position control circuit 2108 and lever longitudinal direction position control means 2109 for controlling a distance between the lever 2102 and the tested matter 2101 so as to keep a working force detected thereby constant, an edge detection circuit for detecting an edge of the tested pattern 2101a according to a control signal 22a generated from the lever longitudinal direction position control circuit 2108, a coherence light source 2114, a beam splitter 2115, mirrors 2116, 2117, 2118, a photodiode 2119 and a lateral direction movement detection circuit 2120 for detecting a relative movement amount of the lever 2102 and the stage 2111 in the direction of measurement, and a shape calculation circuit 2113 for outputting a line width measurement value 22e of the tested pattern 2101a by obtaining an edge position of the tested pattern 2102a detected according to detection signals 22d, 22b generated from the lateral direction movement detection circuit 2120 and the edge detection circuit 2112.

In the above-described construction, a flexure arises on the lever 2102 from the atomic force 2103 working between the insulating tested pattern 2101a and the lever 2102 kept closely opposite thereto at a distance of 1 nanometer or below. Then, a bias voltage is applied by the bias power supply 2104 on the back of the lever 2102 subjected to a conductivity treatment through metal coating by vaporization or other process, and a tunnel current 2106 flowing between the lever 2102 and the probe 2105 kept closely opposite to the back thereof at a distance of 1 nanometer or below is detected by the tunnel current detection circuit 2107. Then, a longitudinal position of the lever 2102 is controlled by the lever longitudinal direction position control circuit 2108 and the lever longitudinal direction position control means 2109 so as to keep the detected tunnel current constant, that is, the flexure of the lever 2102 constant. Then, the stage 2111 is moved laterally at the same time by stage driving means 2110 and scans the tested pattern 2101 against the projection 2102a of the lever 2102. A locus of the lever tip in this case is as shown on an uppermost stage of FIG. 17.

An edge of the tested pattern 2101a is detected by the edge detection circuit 2112 according to the lever longitudinal direction position control signal 22a thus obtained, and a plurality of edge detection signals 22b are output to the shape calculation circuit 2113. The edge detection circuit 2112 includes a differentiation circuit, and generates an output (differential signal) according to a speed of change in output of the signal 22a so caused at the edge portion. The change speed corresponding signal is used as an edge signal. For edge position, a position where the signal is maximized in value or center position of half-amplitude level is used. The edge signal 22b holds positive if, for example, the edge comes upward right in FIG. 17A, but negative if upward left according to how the edge to scan faces.

An arrangement is such that a longitudinal position of the lever 2102 is controlled, and a detection signal is obtained from the control signal. Therefore the projection will never come into contact with the pattern, irrespective of a large difference in step of the pattern.

In parallel therewith, on the other hand, a coherent light of single frequency from the coherence light source 2114 is divided into two by the beam splitter 2115, one light is incident on the mirror 2117 fixed on the stage 2111 through the mirror 2116, and the reflected light is reincident on the beam splitter 2115, the other light is incident on the mirror 2118 fixed near the lever 2102 and the reflected light is reincident on the beam splitter 2115. Then, the two reflected lights are combined again by the beam splitter 2115 and are incident on the photodiode 2119 as an interference light. In this case, there arises a change in brightness of the interference light incident on the photodiode 2119 according to a lateral relative movement of the stage 2111 or the tested pattern 2101a and the lever 2102. For example, if a wavelength of the coherent light is λ, the brightness for one period changes when the relative movement amount is λ/2. Accordingly, the relative lateral movement amount can be read at a precision of 1 nanometer by counting a light intensity change signal 22c from the photodiode 2119. From carrying out the counting on the lateral direction movement detection circuit 2120, the lateral direction movement amount signal 22d is obtained and output to the shape calculation circuit 2113.

In the shape calculation circuit 2113, the line width measurement value 22e is calculated and output according to the plural edge detection signal 22b and the lateral direction movement amount signal 22d.

In this example, the pattern line width value is measured according to an increment of the lateral direction movement amount signal from a generation of the positive edge detection signal until a generation of the negative edge detection signal, and the result is output.

Then, the case wherein Michelson interferometry using a single frequency as the coherence light source 2114 is applied is indicated in this embodiment. However, a photoheterodyne interferometry using a double-cycle orthogonal polarization laser such as a Zeeman laser or the like may be applied otherwise.

Embodiment 9

Figure 18:
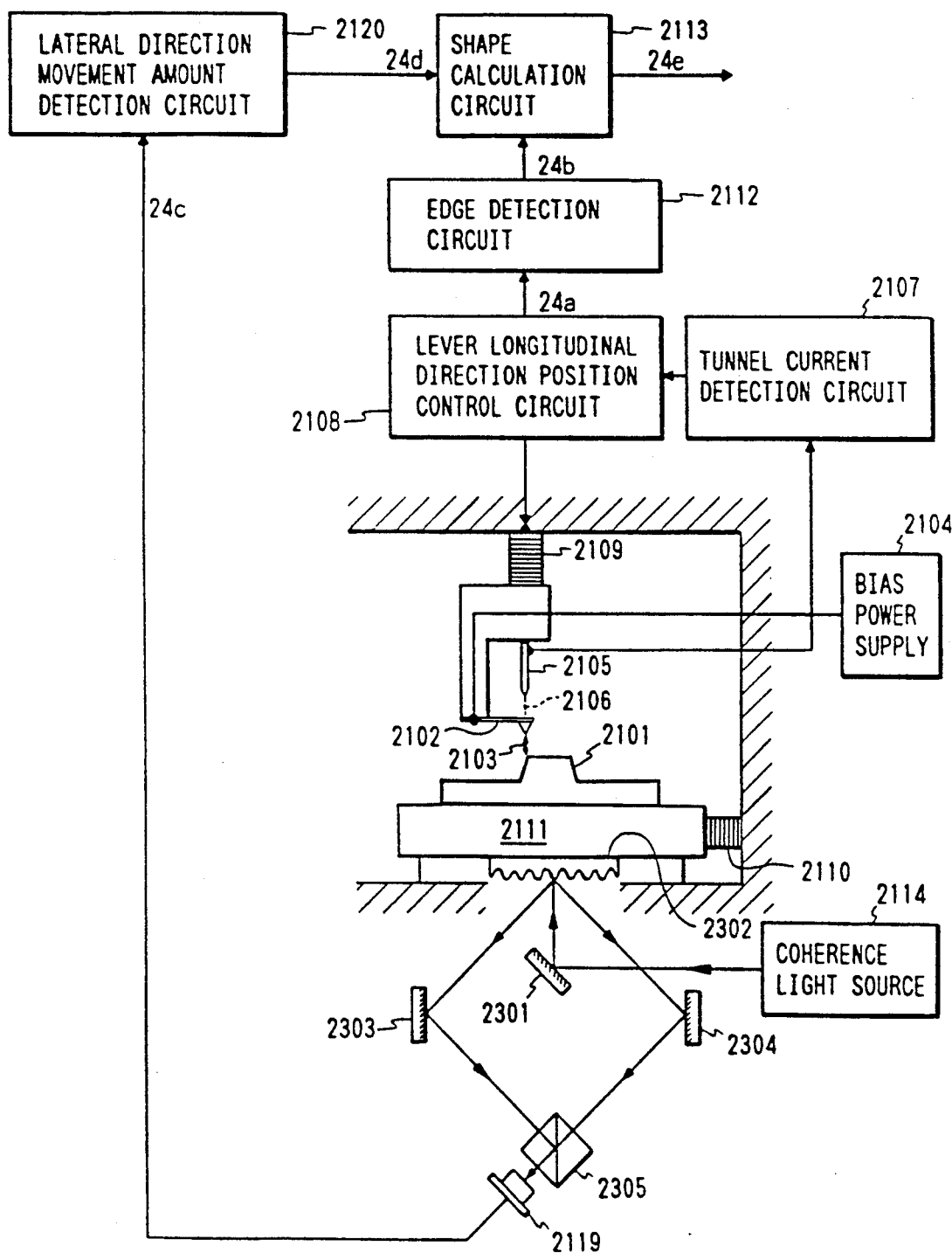
FIG. 18 is a block diagram of a line width measuring apparatus given in a ninth embodiment of the invention.

FIG. 18 is a block diagram of a line width measuring apparatus relating to a ninth embodiment of the invention, and FIGS. 19A through 19F are waveform diagrams of signal examples in each part of the apparatus.

As shown in FIG. 18, the apparatus is different from that of FIG. 16 only in the construction of means for detecting a relative drive amount of the lever 2102 and the stage 2111 in the direction of measurement, the relative drive amount detection means comprising a diffraction grid 2302 fixed on the stage 2111, mirrors 2303, 2304 for combining output lights of the coherence light source 2114, and a beam splitter 2305 for combining diffracted lights reflected by the mirrors 2303, 2304 to be incident on the beam splitter 2305.

In the above-described construction, a coherent light from the coherence light source 2114 is incident on the diffraction grid 2302 through the mirror 2301, and when ± n-th degree diffracted lights obtained thereby are reflected by the mirrors 2303, 2304 to be incident on the beam splitter 2305, the two diffracted lights are combined by the beam splitter 2305, and incident on the photodiode 2119 as an interference light. In this case, there arises a change in brightness of the interference light incident on the photodiode 2119 according to a lateral relative movement of the stage 2111 or the tested pattern 2101 and the lever 2102. For example, if the relative movement amount corresponds to one pitch of the diffraction grid 2302, the brightness change comes in two periods when ± first degree diffracted lights are made to interfere. Accordingly, a lateral direction movement amount signal 24d is obtained from counting a light intensity change signal 24c generated by the photodiode 2119 on the lateral direction movement detection circuit 2120, and is output to the shape calculation circuit 2113.

In the shape calculation circuit 2113, a tested pattern line width measurement value 24e is calculated and output as in the case of the eighth embodiment according to the lateral direction movement amount signal 24d and a plurality of edge detection signals 24b obtained as in the case of the eighth embodiment.

Then, the case wherein the method is combined with a grid interferometry using a single frequency laser as the coherence light source 2114 is indicated in this embodiment. However, it may be combined otherwise with grid interferometry according to a photoheterodyne process using a double-cycle orthogonal polarization laser such as a Zeeman laser or the like.

Embodiment 10

Figure 20:
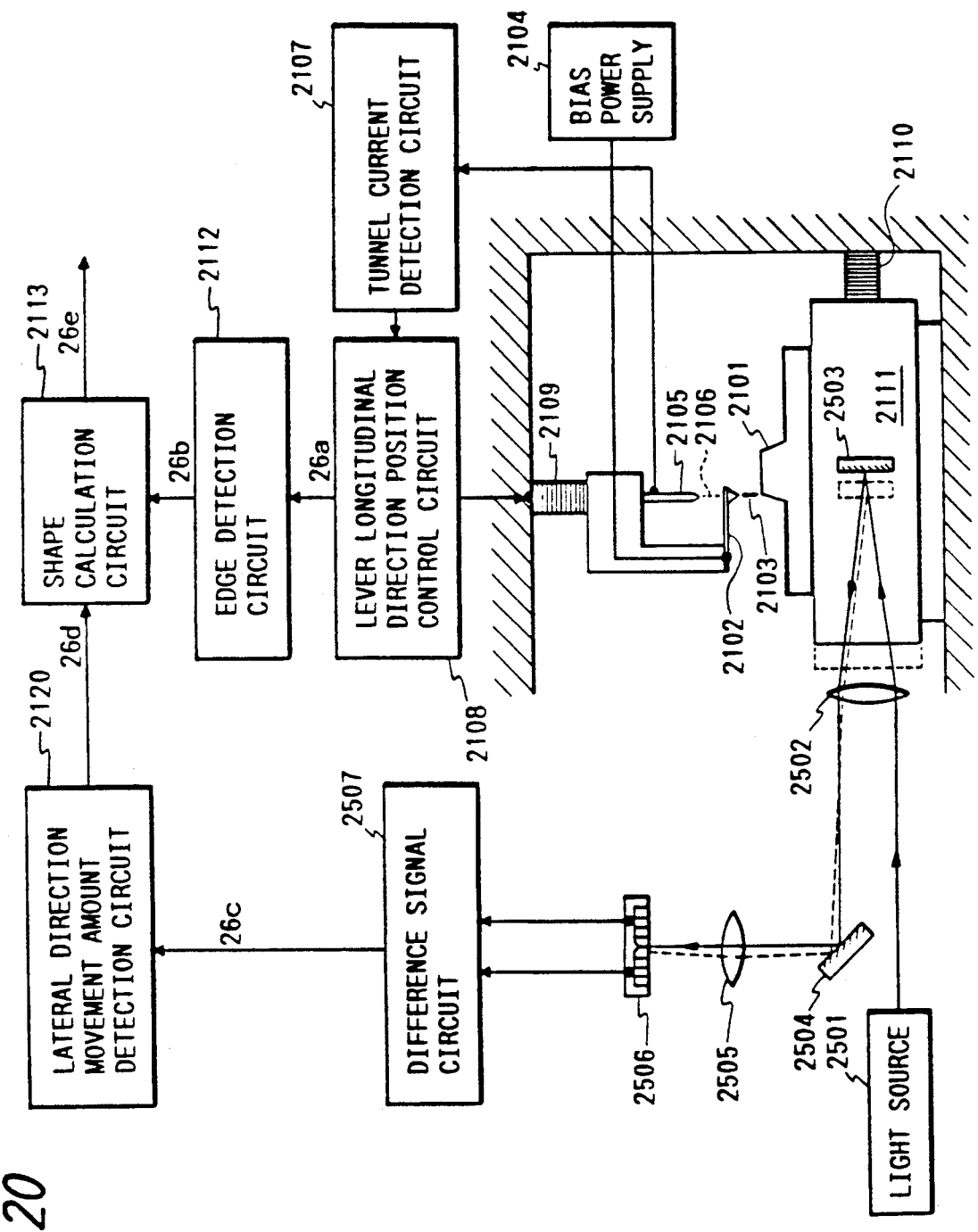
FIG. 20 is a block diagram of a line width measuring apparatus given in a tenth embodiment of the invention.

FIG. 20 is a block diagram of a line width measuring apparatus relating to a tenth embodiment of the invention, and FIGS. 21A through 21F are waveform diagrams showing signal examples in each part of the apparatus.

The apparatus is also different from that of FIG. 16 only in construction of the relative drive amount detection means as shown in FIG. 20, the relative drive amount detection means comprising a light source 2501, a mirror 2503 fixed on the stage 2111, an objective lens 2502 for obtaining an output light of the light source 2501 incident on the mirror 2503 and transmitting the reflected light, an imaging lens 2505 for imaging the transmitted light, a position detection light receiving element 2506 for detecting a position of the image, and a difference signal circuit 2507 for outputting a difference signal 26c between a light quantity signal integral value coming rightward of a center position of the position detection light receiving element 2506 and that of coming leftward to the lateral direction movement detection circuit 2120.

In the above-described construction, a parallel luminous flux from the light source 2501 is incident on the objective lens 2502 outside the axis, and the transmitted light is reflected by the mirror 2503 fixed on the stage 2111. In this case, a position of the objective lens 2502 is controlled so that the mirror 2503 will be positioned near a focus of the objective lens 2502. A flux of the reflected light passes through the objective lens 2502 to be parallel again, and is incident on a center position of the position detection light receiving element 2506 by way of a mirror 2504 and the imaging lens 2505. In this case, the center position of the position detection light receiving element 2506 is controlled so as to come on a focus position of the imaging lens 2505. Here, the luminous flux incident on the position detection light receiving element 2506 is dislocated laterally in the direction of incidence according to a lateral relative movement of the stage 2111 or the tested pattern 2101 and the lever 2102. Accordingly, the difference signal 26c between a light quantity signal integral value coming rightward of the center position of the position detection light receiving element 2506 and that of coming leftward thereof is obtained through the difference signal circuit 2507, and from monitoring it, the lateral relative movement amount can be read at a precision of 1 nanometer. Therefore, a lateral direction movement amount signal 26d is obtained through the lateral direction movement detection circuit 2120 and output to the shape calculation circuit 2113. In the shape calculation circuit 2113, a tested pattern line width measurement value 26e is calculated and output as in the case of the eighth embodiment according to the lateral direction movement amount signal 26d and a plurality of edge detection signals 26b are obtained as in the case of the eighth embodiment.

Embodiment 11

Figure 22:
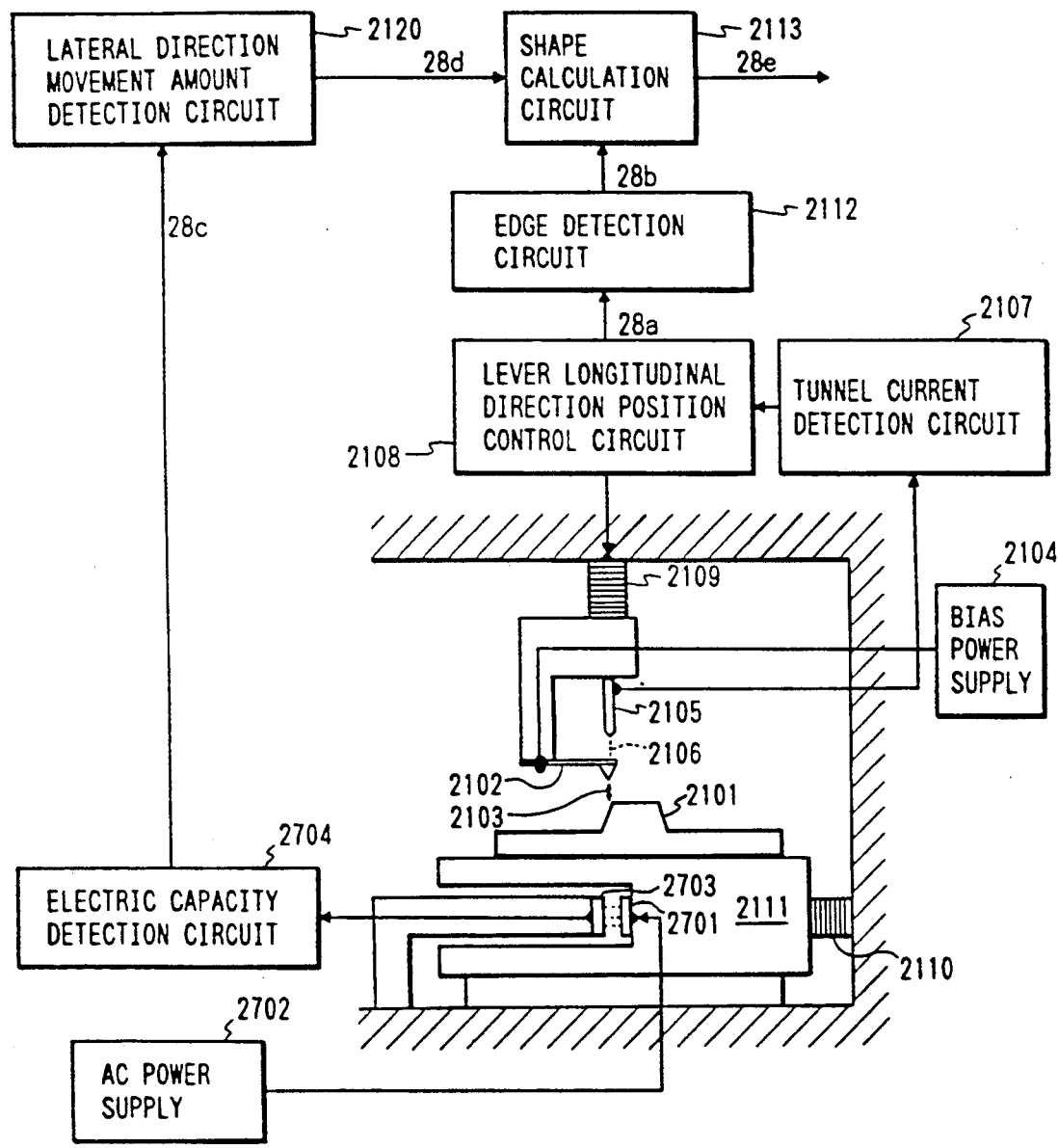
FIG. 22 is a block diagram of a line width measuring apparatus given in an eleventh embodiment of the invention.

FIG. 22 is a block diagram of a line width measuring apparatus relating to an eleventh embodiment of the invention, and FIGS. 23A through 23F are waveform diagrams showing signal examples in each part of the apparatus.

The apparatus is also different from the apparatus of FIG. 16 only in a construction of the relative drive amount detection means as shown in FIG. 22, the relative drive amount detection means comprising a plate 2701 fixed on the stage 2111, a plate 2703 fixedly positioned against the lever 2102, an AC power supply 2702 for applying an AC voltage between the plates 2701, 2703, and an electric capacity detection circuit 2704 for detecting an electric capacity between the plates 2701, 2703 and outputting an electric capacity signal 28c to the lateral direction movement detection circuit 2120.

In the above-described construction, an AC voltage is applied to the plate 2701 by the AC power supply 2702, and an electric capacity between the plates 2701 and 2703 is detected by the electric capacity detection circuit 2704. However when the stage 2111 or the tested pattern 2101 and the lever 2102 move relatively in the lateral direction, the electric capacity between the plates 2701, 2703 changes. Accordingly, the lateral relative movement amount can be read at a precision of 1 nanometer by monitoring the electric capacity signal 28c, and hence, a lateral direction movement amount signal 28d is obtained through the lateral direction movement detection circuit 2120 and then output to the shape calculation circuit 2113. In the shape calculation circuit 2113, a tested pattern line width measurement value 28e is calculated and output as in the case of the eighth embodiment according to the lateral direction movement amount signal 28d and a plurality of edge detection signals 28b are obtained as in the case of the eighth embodiment.

Embodiment 12

Figure 24:
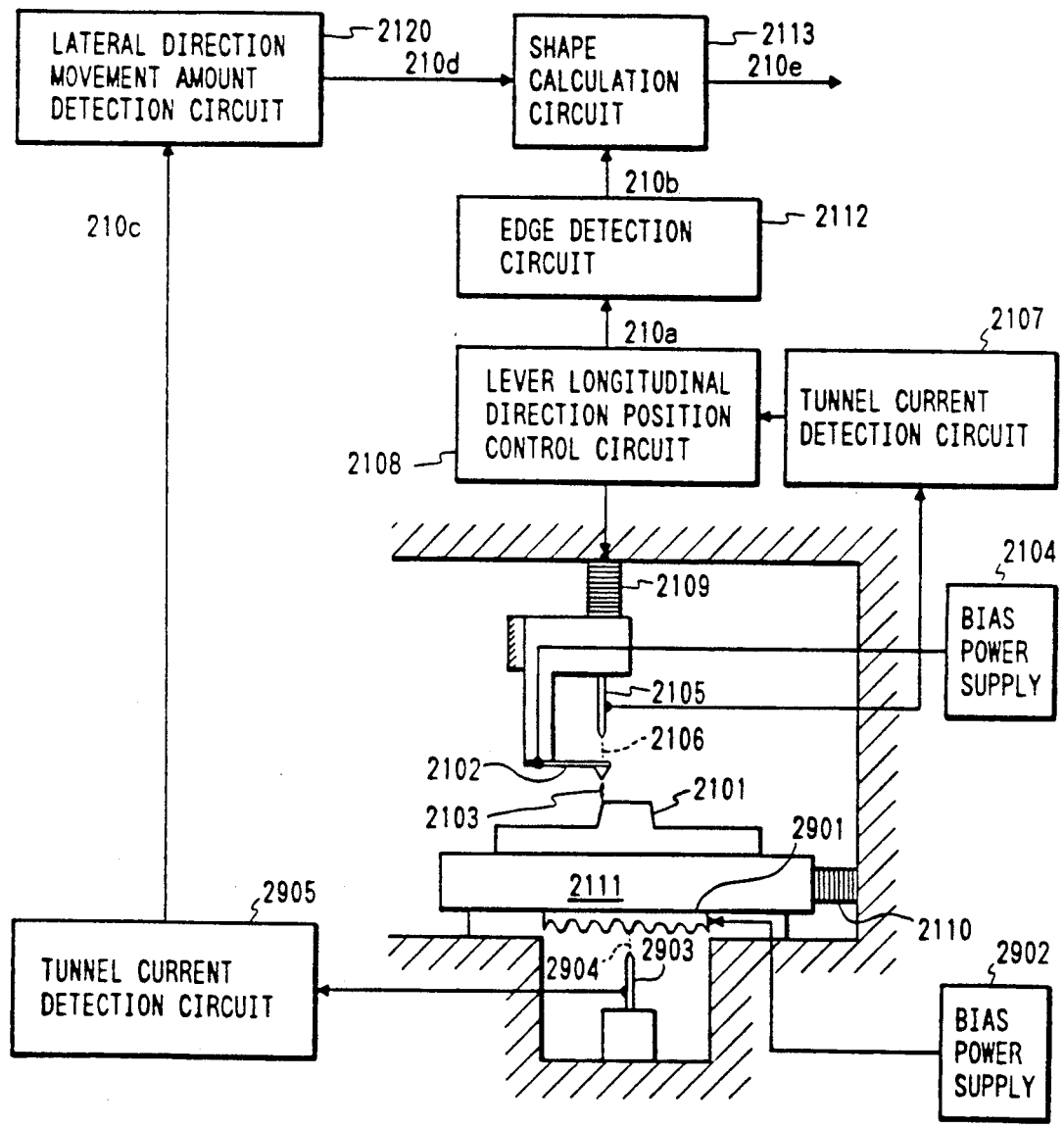
FIG. 24 is a block diagram of a line width measuring apparatus given in a twelfth embodiment of the invention.

FIG. 24 is a block diagram of a line width measuring apparatus relating to a twelfth embodiment of the invention, and FIGS. 25A through 25F are waveform diagrams showing signal examples in each part of the apparatus.

The apparatus is also different from the apparatus of FIG. 16 only in a construction of the relative drive amount detection means as shown in FIG. 24, the relative drive amount detection means comprising a conductive reference scale 2901 fixed on the stage 2111, a probe 2903 having the tip kept close to the reference scale 2901 at a distance of 1 nanometer or below and fixedly positioned against the lever 2102, a bias power supply 2902 for applying a bias voltage between the reference scale 2901 and the probe 2903, and a tunnel current detection circuit 2905 for detecting a tunnel current 2904 flowing between the reference scale 2901 and the probe 2903 and outputting a tunnel current signal 210c to the lateral direction movement detection circuit 2120.

In the above-described construction, a bias voltage is applied to the reference scale 2901, and the tunnel current 2904 flowing between the probe 2903 and the reference scale 2901 is detected by the tunnel current detection circuit 2905. However, when the stage 2111 or the tested pattern 2101 and the lever 2102 make a lateral relative movement, an interval between the reference scale 2901 and the probe 2903 changes at a pitch period of the reference scale 2901, and thus, a change in intensity arises on the tunnel current 2904. For example, if an atomic array of a cleavage plane surface of conductive crystal such as graphite or the like is used as the reference scale 2901, and an interatomic distance is 0.2 nanometers, then the change in intensity corresponds to one period when the relative movement amount is 0.2 nanometers. Accordingly, the lateral relative movement amount can be read at a precision of 1 nanometer or below according to the tunnel current signal 210c from the tunnel current detection circuit 2905. Therefore, the lateral direction movement detection circuit 2120 counts the tunnel current signal 210c to obtain a lateral direction movement amount signal 210d and outputs it to the shape calculation circuit 2113.

In the shape calculation circuit 2113, a tested pattern line width measurement value 210e is calculated and output as in the case of the eighth embodiment according to the lateral direction movement amount signal 210d and a plurality of edge detection signals 210b obtained are as in the case of the eighth embodiment.

Embodiment 13

Figure 26:
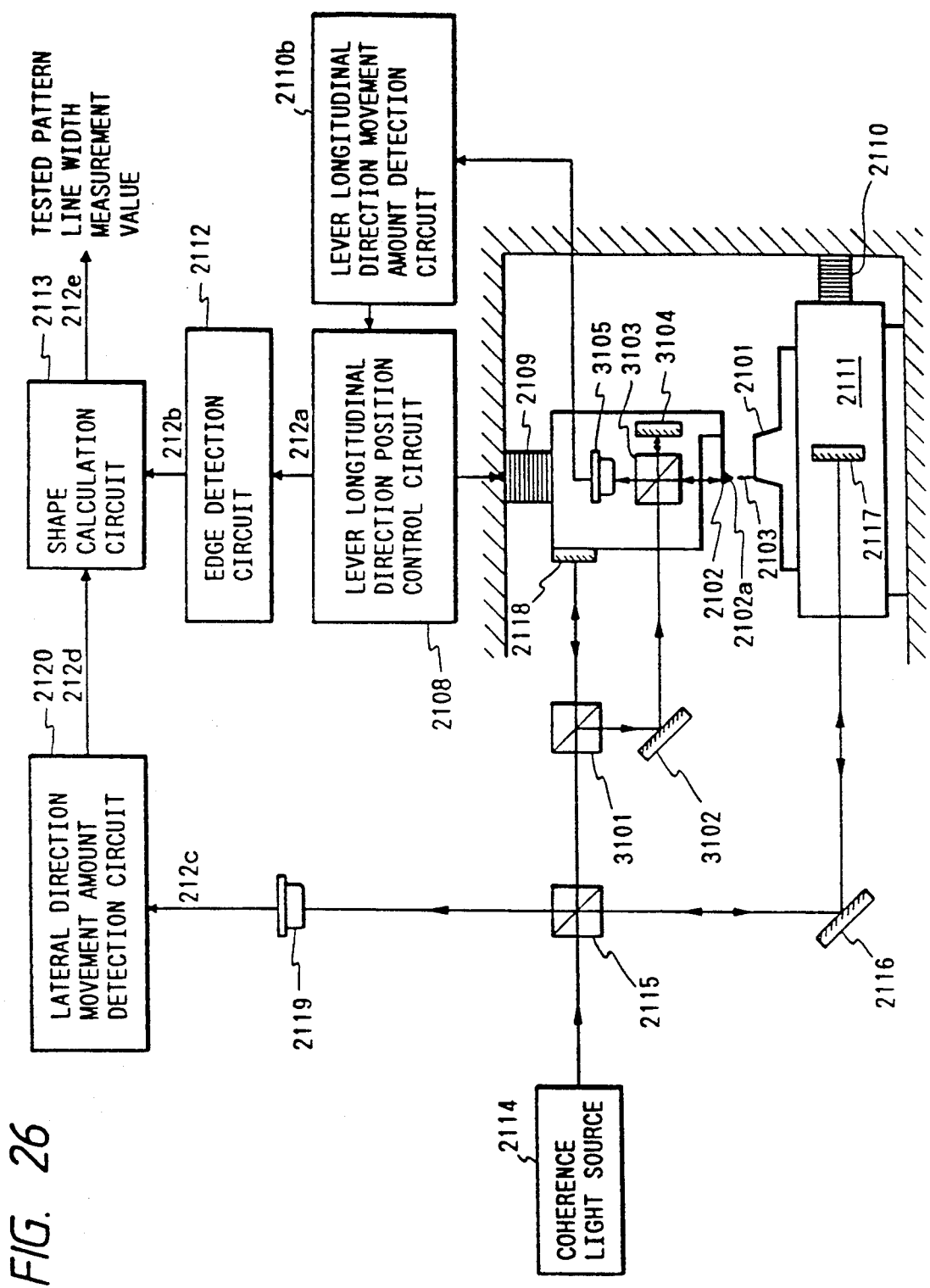
FIG. 26 is a block diagram of a line width measuring apparatus given in a thirteenth embodiment of the invention.

FIG. 26 is a block diagram of a line width measuring apparatus relating to a thirteenth embodiment of the invention, and FIGS. 27A through 27F are waveform diagrams showing signal examples in each part of the apparatus.

The apparatus is different from that of FIG. 16 only in the construction of working force detection means for detecting the atomic force 2103 as a displacement of the free end of the lever 2102 as shown in FIG. 26, the working force detection means comprising, as illustrated therein, optical means wherein a coherent light output by the coherence light source 2114 is incident on a beam splitter 3103 by way of a beam splitter 3101 and a mirror 3102 and divided thus into two, the two light beams being irradiated for reflection onto the free end of the lever 2102 and a mirror 3104 fixed on a fixed end of the lever 2102 each and then combined again by the beam splitter 3103, a photodiode 3105 for detecting an interference light obtained by the optical means, and a lever longitudinal direction movement detection circuit 3106 for detecting a displacement (longitudinal movement amount) of the free end of the lever 2102 according to a light intensity signal generated by the photodiode 3105 and outputting it to the lever longitudinal direction position control circuit 2108.

In the above-described construction, a flexure arises on the lever 2101, as described hereinbefore, according to the atomic force 2103 working between the insulating tested pattern 2101 and the lever 2102 kept closely opposite thereto at a distance of 1 nanometer or below. Then, the coherent light from the coherence light source 2114 which is incident through the beam splitter 2115 is incident on the beam splitter 3103 by way of the beam splitter 3101 and the mirror 3102, and one of the light beams divided into two is reflected by a back of the lever 2102, the other is reflected by the mirror 3104, the two light beams being combined again by the beam splitter 3103, and the interference light is incident on the photodiode 3105. The interference light then produces a change in brightness according to a vertical movement of the lever 2102 due to flexure, which is detected by the photodiode 3105, and thus, a light intensity is detected in the lever longitudinal direction movement detection circuit 3106. Then, a longitudinal position of the lever 2102 is controlled by the lever longitudinal direction position control circuit 2108 and the lever longitudinal direction position control means 2109 so as to keep the detected light intensity, or the flexure of the lever 2102 or the atomic force 2103 constant. Accordingly, if the stage 2111 is moved laterally by the stage driving means 2110, and the tested pattern is scanned with a projection of the lever 2102, then the atomic force 2103 changes according to a tongued-and-grooved face of the pattern and the free end of the lever 2102 is displaced thereby. Since a lever longitudinal direction position control signal 212a generated by the lever longitudinal direction position control circuit 2108 then includes information on the edge of the tested pattern 2101, the edge of the tested pattern 2101 is detected by the edge detection circuit 2112 as in the case of the eighth embodiment, and a plurality of edge detection signals 212b are output to the shape calculation circuit 2113.

In the shape calculation circuit 2113, a tested pattern line width measurement value 212e is calculated and output as in the case of the eighth embodiment according to the plural edge detection signals 212b and a lateral direction movement amount signal 212d obtained as in the case of the eighth embodiment.

Then, the case wherein Michelson interferometry using a single frequency laser as the coherence light source 2114 is applied is indicated herein. However, a photoheterodyne interferometry using a double-cycle orthogonal polarization laser such as a Zeeman laser or the like may be applied otherwise. Further, while the case wherein a photowave interferometry is applied is indicated as a method for detecting an amount of relative movement of the tested pattern 2101 and the lever 2102, grid interferometry, TTL active auto focusing method, method for detecting a change of electric capacity, relative position detecting method using a tunnel current may also be applied as indicated in the embodiments ninth to twelfth.

Embodiment 14

Figure 28:
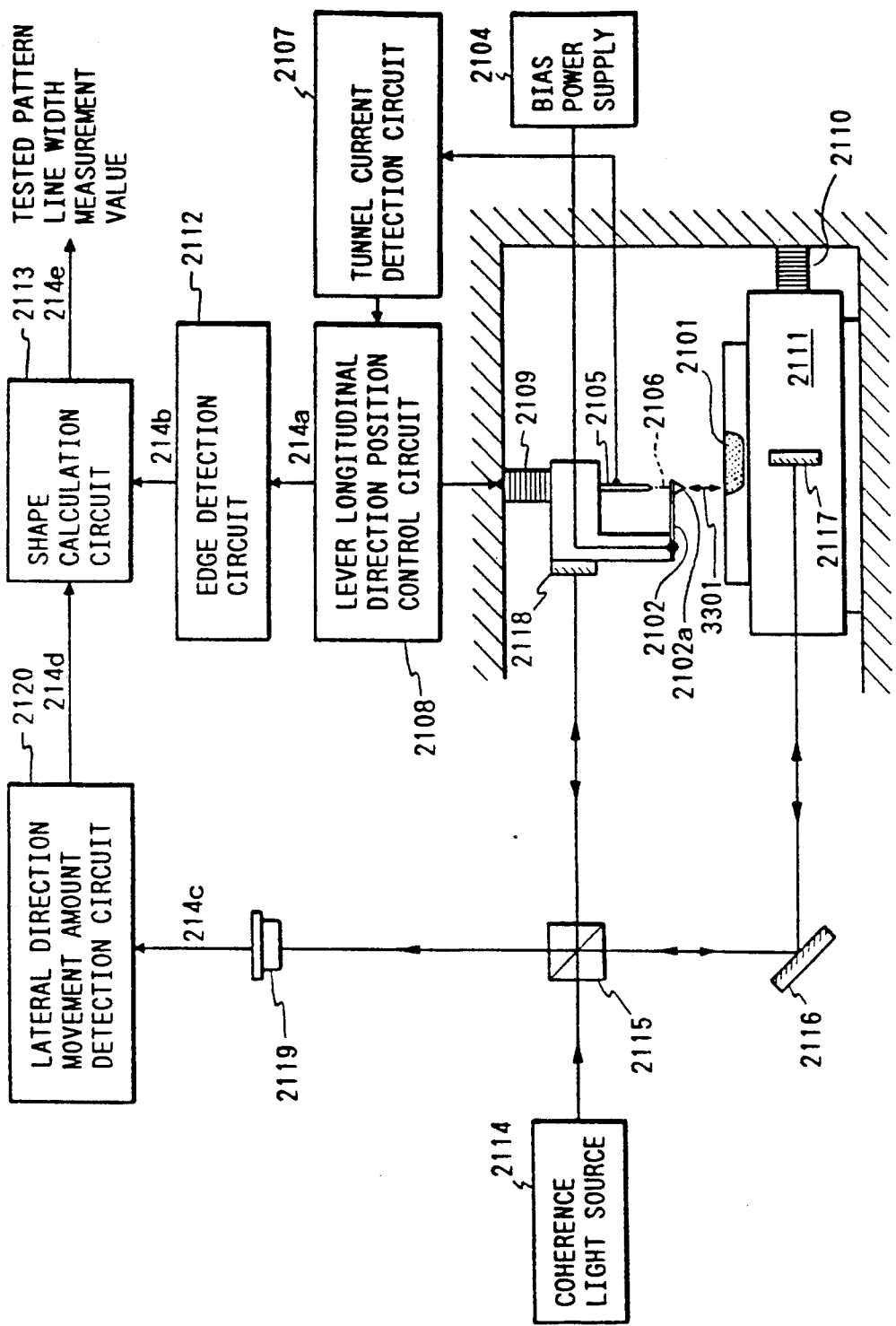
FIG. 28 is a block diagram of a line width measuring apparatus given in a fourteenth embodiment of the invention.
Figure 29A:
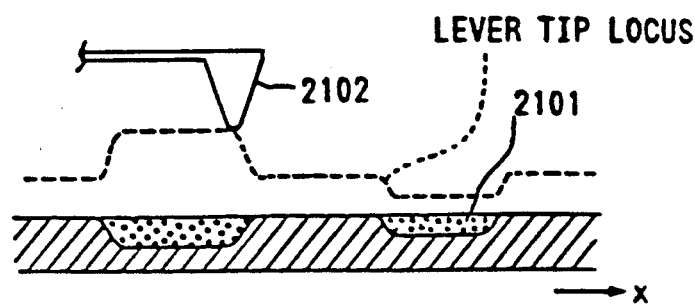
FIGS. 29A through 29F are waveform diagrams showing signal examples of each part of the apparatus.
Figure 29B:
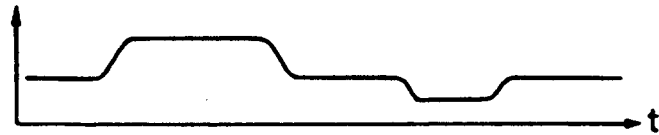
Figure 29C:
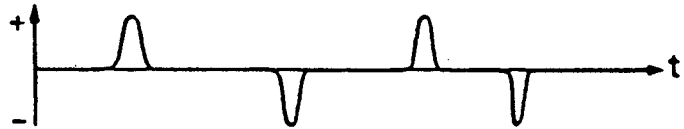
Figure 29D:
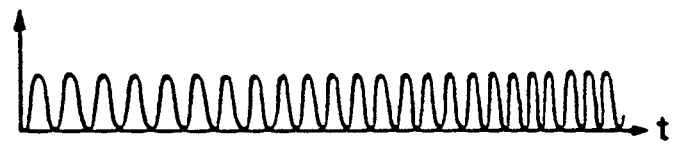
Figure 29E:
Figure 29F:

FIG. 28 is a block diagram of a line width measuring apparatus relating to a fourteenth embodiment of the invention, and FIGS. 29A through 29F are waveform diagrams showing signal examples in each part of the apparatus.

As shown in FIG. 28, the apparatus comprises using a magnetic force 3301 as working on the lever 2102, the tested pattern 2101 and the lever 2102 having a magnetism, which is different from the construction of the eighth embodiment, and the projection 2102a of the lever 2102 is disposed closely opposite to the tested pattern 2101 at a distance of 1 nanometer or below. The construction and operation of other portions are similar to those of the eighth embodiment.

Accordingly, a displacement of the free end of the lever 2102 caused by the magnetic force 3301 changing wherein the stage 2111 is moved laterally and the tested pattern 2101 is scanned with the lever 2102 is detected and so controlled as to be constant in this case. Then, a tested pattern line width measurement value 214e is calculated and output by the shape calculation circuit 2113 according to a plurality of edge detection signals 214b obtained as in the case of the eighth embodiment and a lateral direction movement amount signal 214d.

Meanwhile, Michelson interferometry using a single frequency laser as the coherence light source 2114 is employed in this embodiment. However, a photoheterodyne interferometry using a double-cycle orthogonal polarization laser such as a Zeeman laser or the like may be applied otherwise. Further, photowave interferometry is used as a method for detecting an amount of relative movement of the tested pattern 2101 and the lever 2102. However, grid interferometry, TTL active auto focusing method, a method for detecting a change of electric capacity, or a relative position detecting method using a tunnel current may also be applied as indicated in the embodiments ninth to twelfth. Then, a tunnel current is used as means for detecting a vertical flexure of the lever 2102. However, the photowave interferometry given in the embodiments eighth to twelfth may also be used.

As described above, according to the invention, a tunnel current flowing between the tested pattern having a conductive member and the probe, or an atomic force or magnetic force working between the insulating or magnetic tested pattern and lever will be detected on principles of STM, AFM and MFM. Therefore, edges can be detected at a transverse resolution of 0.1 nanometers. Further interedge length is measured by using an optical measuring method having a long-stroke and nanometer-order high resolution and high precision, a method for detecting a change of electric capacity, or a method for detecting an amount of relative movement with the reference scale using an electron tunneling. Therefore, a line width of hyperfine worked pattern or the like can be measured in a small and simple construction at a nanometer-order high resolution and high precision, irrespective of error in a relative drive system of the lever and the tested pattern.

What is claimed is:

1. An apparatus for detecting at least one interval between a plurality of edge portions present on a tested surface, said apparatus comprising:
   a probe for relatively moving along the tested surface;
   detection means for detecting one of a working force and a tunnel current generated between said probe and the tested surface and for producing a detection output;
   edge detection means comprising means for receiving the detection output signal, and means for detecting edge portions on the tested surface according to one of the working force and the tunnel current detected by said detection means and for producing an edge detection output; and
   edge interval detection means comprising means for receiving the edge detection output and means for detecting at least one edge interval between the edge portions detected by said edge detection means, said edge interval detection means being distinct from said edge detection means.

2. The apparatus as defined in claim 1, further comprising probe position control means for controlling position of said probe to keep constant the detection output produced by said detection means and for producing a probe position control output.

3. The apparatus as defined in claim 2, wherein said edge detection means comprises means for detecting edges from a differential signal of the probe position control output produced by said probe.

4. The apparatus as defined in claim 1, further comprising vibration means for vibrating said probe at a predetermined frequency in a predetermined direction, said edge detection means comprising means for detecting edge portions according to a change in amplitude of a predetermined frequency component of the outgoing signal of said detection means when the probe is vibrated by said vibration means.

5. The apparatus as defined in claim 4, further comprising probe position control means for controlling a position of the probe so as to steady a component other than the predetermined frequency component of the outgoing signal of said detection means.

6. The apparatus as defined in claim 4, wherein said vibration means comprises means for vibrating said probe in the direction of the tested surface.

7. The apparatus as defined in claim 4, wherein said vibration means comprises means for vibrating said probe in a direction parallel to the tested surface.

8. The apparatus as defined in claim 1, wherein said detection means comprises means for detecting an atomic force generated between said probe and the tested surface as the working force.

9. The apparatus as defined in claim 1, wherein said detection means comprises means for detecting a magnetic force generated between said probe and the tested surface as a working force.

10. The apparatus as defined in claim 1, wherein said edge interval detection means comprises an interferometer for generating signals at each unit distance related to a wavelength of the light.

11. The apparatus as defined in claim 1, wherein said interval detection means comprises means for detecting the line width of a pattern provided on the tested surface.

12. The apparatus as defined in claim 1, wherein said edge interval detection means comprises a grid interferometer for generating signals at each of predetermined distances according to a pitch of a diffraction grid.

13. The apparatus as defined in claim 1, wherein said edge interval detection means comprises a mirror for moving integrally with the tested surface, and means for detecting a reflected light incident position when a luminous flux is irradiated on the mirror, and means for detecting a distance from the incident position detected by the detection means.

14. The apparatus as defined in claim 1, wherein said edge interval detection means comprises means for detecting a distance according to an electric capacity of a plate moving integrally with the tested surface and a fixed plate.

15. The apparatus as defined in claim 1, wherein said edge interval detection means comprises a reference scale for moving integrally with the tested surface, and a tunnel current detecting probe provided opposite to the scale, and means for detecting a distance according to a tunnel current detected by said tunnel current detecting probe.

16. An apparatus for measuring a line width of a pattern present on a tested surface, said apparatus comprising:
 a probe for relatively moving along the tested surface;
 movement distance detection means for detecting a relative distance of movement between said probe and the tested surface, and for producing a movement distance detection signal;
 detection means for detecting one of a working force and a tunnel current generated between said probe and the tested surface, and for producing a detection signal;
 edge detection means for detecting edge portions at both ends of a predetermined pattern on the tested surface according to one of the working force and the tunnel current detected by said detection means, and for producing an edge detection signal; and
 pattern line width detection means for detecting a pattern line width according to the edge detection signal, indicative of both end edge portions of the predetermined pattern detected by said edge detection means, and according to the movement distance signal detected by said movement distance detection means, indicative of a distance of movement during the detection of both end edge portions.

17. The apparatus as defined in claim 16, further comprising probe position control means for controlling position of said probe to keep constant the detection output signal produced by said detection means, and for producing a probe position control signal, wherein said edge detection means comprises means for detecting edge portions based on the control signal produced by said probe position control means.

18. The apparatus as defined in claim 16, further comprising vibration means for vibrating said probe at a predetermined frequency in a predetermined direction along the tested surface, wherein said edge detection means comprises means for detecting edge portions on the basis of a change in amplitude of a predetermined frequency component of the detection signal produced by said detection means when said vibration means vibrates said probe.

19. The apparatus as defined in claim 16, wherein said detection means comprises means for detecting an atomic force generated between said probe and the tested surface as the working force.

20. The apparatus as defined in claim 16, wherein said detection means comprises means for detecting a magnetic force generated between said probe and the tested surface as the working force.

21. An apparatus for measuring an interval between a plurality of edge portions present on a tested surface, said apparatus comprising:
 a probe positioned opposite to the tested surface;
 detection means for detecting one of a working force and a tunnel current generated between said probe and the tested surface and for producing a detection output;
 edge detection means for receiving the detection output, for detecting the edge portions according to one of the working force and the tunnel current detected by said detection means and for producing an edge detection output;
 movement means for relatively moving said probe along the tested surface from one of the edge portions to another;
 movement distance detection means for detecting a relative distance of movement between said probe and the tested surface, and for producing a movement distance detection signal; and
 measurement means for receiving the edge detection output and the movement distance detection signal, and for measuring a distance of relative movement of the probe moved by said movement means from a position where said edge detection means detects the one edge portion to a position where said edge detection means detects the other edge portion.

22. An apparatus as defined in claim 21, further comprising: probe position control means for controlling the position of said probe to keep constant the detection output produced by said detection means, and for producing a probe position control signal.

23. An apparatus as defined in claim 22, wherein said edge detection means detects the edge portions from a differential signal of said control signal.

24. An apparatus as defined in claim 21, further comprising vibration means for vibrating said probe at a predetermined frequency in a predetermined direction, wherein said edge detection means detects the edge portions according to a change in amplitude of a predetermined frequency component of a monitoring signal of one of the working force and the tunnel current generated between said probe and the tested surface when the probe is vibrated by said vibration means.

25. An apparatus as defined in claim 24, further comprising a filter for eliminating the predetermined frequency component from the monitoring signal and for producing a filtered signal, and probe position control means for receiving the filtered signal and for controlling the position of said probe to keep the filtered signal constant.

26. An apparatus as defined in claim 24, wherein said vibration means vibrates said probe in a direction perpendicular to the tested surface.

27. An apparatus as defined in claim 24, wherein said vibration means vibrates said probe in a direction parallel to the tested surface.

28. An apparatus as defined in claim 21, wherein said edge detection means monitors an atomic force generated between said probe and the tested surface as the working force.

29. An apparatus as defined in claim 21, wherein said edge detection means monitors a magnetic force generated between said probe and the tested surface as the working force.

30. An apparatus as defined in claim 21, wherein said edge detection means comprises voltage application means for applying a voltage between said probe and the tested surface, and tunnel current detection means for detecting a tunnel current flowing between said probe and the tested surface when applying the voltage.

31. An apparatus as defined in claim 21, wherein said movement distance detection means comprises an interferometer for generating signals at each of predetermined unit distances relative to light wavelength.

32. An apparatus as defined in claim 21, wherein said movement distance detection means comprises a grid interferometer for generating signals at each of predetermined distances according to a pitch of a diffraction grid.

33. An apparatus as defined in claim 21, wherein said movement distance detection means comprises a mirror moving together with the tested surface, means for causing light flux to be incident on said mirror at a non-perpendicular angle, and means for measuring the distance of movement by a shift of a receiving position at which light reflected on said mirror is received, of reflected light caused by moving the mirror.

34. An apparatus as defined in claim 21, wherein said movement distance detection means comprises a first pole plate that moves together with the tested surface, a second pole plate that is fixed, and means for measuring the distance of movement by a change in electric capacity between the first pole plate and the second pole plate caused by moving the first pole plate.

35. An apparatus as defined in claim 21, wherein said movement distance detection means comprises a reference scale moving together with the tested surface, a second probe provided opposite to said reference scale, means for applying a voltage between the reference scale and the second probe, means detecting a tunnel current flowing between the reference scale and the second probe by applying the voltage, and means for measuring the distance of movement by a change in tunnel current caused by moving the reference scale.

36. An apparatus as defined in claim 21, wherein said edge detection means comprises line width detection means for detecting a line width of a pattern provided on the tested surface.

37. A method of measuring an interval between a plurality of edge portions present on a tested surface by using an apparatus comprising:
a probe positioned opposite to the tested surface;
detection means for detecting one of a working force and a tunnel current generated between the probe and the tested surface and for producing a detection output;
edge detection means for receiving the detection output, for detecting the edge portions according to one of the working force and the tunnel current detected by said detection means and for producing an edge detection output;
movement means for relatively moving said probe along the tested surface from one of the edge portions to another;
movement distance detection means for detecting a relative distance of movement between said probe and the tested surface, and for producing a movement distance detection signal, said method comprising the steps of:
detecting one of the edge portions by the edge detection means;
relatively moving the probe from the one edge portion to the other by the movement means;
detecting the other edge portion by the edge detection means;
detecting a relative distance of movement between the probe and the tested surface by the movement distance detection means;
producing a movement distance detection signal by the movement distance detection means; and
measuring a relative distance of movement of the probe moved by said movement means from a position where the edge detection means detects the one edge portion to a position where said edge detection means detects the other edge portion in accordance with the edge detection output produced by the edge detection means and the movement distance detection signal produced by the movement distance detection means.

38. A method as defined in claim 37, further comprising the steps of:
controlling the position of the probe to keep constant the detection output produced by the detection means; and
producing a probe position control signal.

39. A method as defined in claim 38, further comprising detecting the edge portions by the edge detection means from a differential signal of the control signal.

40. A method as defined in claim 37, further comprising vibrating the probe at a predetermined frequency in a predetermined direction, and detecting the edge portions by the edge detection means according to a change in amplitude of a predetermined frequency component of a monitoring signal of one of the working force and the tunnel current generated between the probe and the tested surface when the probe is vibrated.

41. A method as defined in claim 40, further comprising the steps of:
filtering the monitoring signal to eliminate the predetermined frequency component and to produce a filtered signal; and
controlling a position of the probe to keep the filtered signal constant.

42. A method as defined in claim 40, further comprising vibrating the probe in a direction perpendicular to the tested surface.

43. A method as defined in claim 40, further comprising vibrating the probe in a direction parallel to the tested surface.

44. A method as defined in claim 37, further comprising monitoring by the edge detection means an atomic force generated between the probe and the tested surface as the working force.

45. A method as defined in claim 37, further comprising monitoring by the edge detection means a magnetic force generated between the probe and the tested surface as the working force.

46. A method as defined in claim 37, further comprising applying by the edge detection means a voltage between the probe and the tested surface and detecting a tunnel current flowing between the probe and the tested surface by applying the voltage.

47. A method as defined in claim 37, further comprising measuring the distance of movement of the probe by an interferometer that generates signals at each of predetermined unit distance relative to light wavelength.

48. A method as defined in claim 37, further comprising measuring the distance of movement of the probe by a grid interferometer that generates signals at each of predetermined distances according to a pitch of a diffraction grid.

49. A method as defined in claim 37, further comprising moving a mirror together with the tested surface, causing light flux to be incident on the mirror at a non-perpendicular angle and receiving the light reflected on the mirror to monitor a shift of a receiving position of the reflected light caused by moving the mirror, to measure the distance of movement of the probe.

50. A method as defined in claim 37, further comprising moving a first pole plate together with the tested surface and fixing a second pole plate, and monitoring a change in electric capacity between the first pole plate and the second pole plate caused by moving the first pole plate, to measure the distance of movement of the probe.

51. A method as defined in claim 37, further comprising moving a reference scale together with the tested surface, providing a second probe provided opposite to the reference scale to apply a voltage between the reference scale and the second probe and detecting a tunnel current flowing between the reference scale and the second probe by applying the voltage to monitor a change in tunnel current according to movement of the reference scale, to measure the distance of movement of the probe.

* * * * *

UNITED STATES PATENT AND TRADEMARK OFFICE
CERTIFICATE OF CORRECTION

PATENT NO. : 5,304,924
DATED : April 19, 1994
INVENTOR(S) : Akihiko YAMANO, et al.

It is certified that error appears in the above-indentified patent and that said Letters Patent is hereby corrected as shown below:

COLUMN 1:

Line 13, "encoder" should read --encoders--.

COLUMN 2:

Line 49, "as as" should read --as--.

COLUMN 3:

Line 47, "not" should be deleted;
Line 48, "flat" should be deleted; and
Line 54, "to" should be deleted.

COLUMN 7:

Line 30, "is" should be deleted.

COLUMN 8:

Line 1, "d distance" should read --d: distance--.

COLUMN 14:

Line 32, "Therefore" should read --Therefore,--.

UNITED STATES PATENT AND TRADEMARK OFFICE
CERTIFICATE OF CORRECTION

PATENT NO. : 5,304,924
DATED : April 19, 1994
INVENTOR(S) : Akihiko YAMANO, et al.

It is certified that error appears in the above-indentified patent and that said Letters Patent is hereby corrected as shown below:

COLUMN 19:

Line 12, "ninth to twelfth." should read --nine to twelve.--;
Line 50, "ninth to twelfth." should read --nine to twelve.--;
Line 53, "eighth" should read --eight--; and
Line 54, "twelfth" should read --twelve--.

COLUMN 22:

Line 39, "prising:" should read --prising--.

Signed and Sealed this

Seventeenth Day of January, 1995

Attest:

BRUCE LEHMAN

Attesting Officer        Commissioner of Patents and Trademarks